(12) United States Patent
Simoudis

(10) Patent No.: US 12,241,753 B2
(45) Date of Patent: Mar. 4, 2025

(54) SYSTEMS AND METHODS FOR PERSONALIZED GROUND TRANSPORTATION PROCESSING AND USER INTENT PREDICTIONS

(71) Applicant: Synapse Partners, LLC, Menlo Park, CA (US)

(72) Inventor: Evangelos Simoudis, Menlo Park, CA (US)

(73) Assignee: Synapse Partners, LLC, Menlo Park, CA (US)

(*) Notice: Subject to any disclaimer, the term of this patent is extended or adjusted under 35 U.S.C. 154(b) by 209 days.

(21) Appl. No.: 17/811,438

(22) Filed: Jul. 8, 2022

(65) Prior Publication Data
US 2022/0341746 A1  Oct. 27, 2022

Related U.S. Application Data

(63) Continuation of application No. PCT/US2021/015020, filed on Jan. 26, 2021.
(Continued)

(51) Int. Cl.
*G01C 21/36* (2006.01)
*G01C 21/34* (2006.01)
(Continued)

(52) U.S. Cl.
CPC ..... *G01C 21/3617* (2013.01); *G01C 21/3423* (2013.01); *G01C 21/3484* (2013.01);
(Continued)

(58) Field of Classification Search
CPC ............ G01C 21/3617; G01C 21/3423; G01C 21/3484; G06N 20/00; G06F 18/214; G06F 18/23
See application file for complete search history.

(56) References Cited

U.S. PATENT DOCUMENTS 7,636,626 B2  12/2009  Oesterling et al.
7,668,691 B2  2/2010  Counts et al.
(Continued)

FOREIGN PATENT DOCUMENTS

CN  107918753 A  4/2018
EP  2369299 B1  8/2013
(Continued)

OTHER PUBLICATIONS

EP21751366.2 European Supplementary Search Report dated Jan. 15, 2024.
(Continued)

*Primary Examiner* — Ramon A. Mercado
*Assistant Examiner* — Mohamad O El Sayah
(74) *Attorney, Agent, or Firm* — Haynes and Boone, LLP

(57) ABSTRACT

The present disclosure provides methods and systems for predicting a trip intent or destination while a user is traveling along a route. The method may comprise: (a) receiving a starting geographic location of the route and data about an identity of the user; (b) retrieving a trained classifier based at least in part on the data about the identity of the user; (c) using the trained classifier to predict the trip intent or destination based on the starting geographic location; and (d) while the user is traveling in a terrestrial vehicle along at least a portion of said route, presenting one or more transactional options to the user on an electronic device, wherein the one or more transactional options are identified based on the trip intent or destination predicted in (c).

20 Claims, 29 Drawing Sheets

Related U.S. Application Data

(60) Provisional application No. 62/969,472, filed on Feb. 3, 2020.

(51) Int. Cl.
  *G06F 18/214* (2023.01)
  *G06F 18/23* (2023.01)
  *G06N 20/00* (2019.01)

(52) U.S. Cl.
  CPC ............ *G06F 18/214* (2023.01); *G06F 18/23* (2023.01); *G06N 20/00* (2019.01)

(56) References Cited

U.S. PATENT DOCUMENTS

| | | | |
|---|---|---|---|
| 7,848,765 B2 | 12/2010 | Phillips et al. | |
| 8,881,057 B2 | 11/2014 | Mori et al. | |
| 8,990,235 B2 | 3/2015 | King et al. | |
| 8,996,304 B2 | 3/2015 | Needham et al. | |
| 9,124,998 B2 | 9/2015 | Sasaki et al. | |
| 9,140,570 B1 | 9/2015 | Baird | |
| 9,377,319 B2 | 6/2016 | San Filippo et al. | |
| 9,536,197 B1 | 1/2017 | Penilla et al. | |
| 9,740,205 B2 | 8/2017 | Ross et al. | |
| 9,751,532 B2 | 9/2017 | Gordon et al. | |
| 9,900,747 B1* | 2/2018 | Park | H04W 4/029 |
| 9,928,524 B2 | 3/2018 | Grimm et al. | |
| 10,104,494 B2 | 10/2018 | Bellens et al. | |
| 10,198,399 B1 | 2/2019 | Fritchman et al. | |
| 10,343,685 B2 | 7/2019 | Zhu et al. | |
| 10,371,526 B2 | 8/2019 | McGavran et al. | |
| 10,449,958 B2 | 10/2019 | Jiang et al. | |
| 10,458,806 B2* | 10/2019 | Chen | G06Q 50/40 |
| 10,469,619 B2 | 11/2019 | Shimizu et al. | |
| 10,489,222 B2 | 11/2019 | Sathyanarayana et al. | |
| 10,553,112 B2 | 2/2020 | Gogic et al. | |
| 10,616,369 B1 | 4/2020 | d'Andrea et al. | |
| 10,816,351 B1* | 10/2020 | Yao | G01C 21/3484 |
| 10,906,552 B2 | 2/2021 | Hecht | |
| 10,928,209 B2 | 2/2021 | Scofield et al. | |
| 10,949,886 B2 | 3/2021 | Tong | |
| 11,054,270 B1* | 7/2021 | Singh | G08G 1/096888 |
| 11,120,349 B1* | 9/2021 | Wu | G06Q 10/04 |
| 11,526,811 B1* | 12/2022 | Wu | G06F 18/21 |
| 11,587,368 B2 | 2/2023 | Cordova et al. | |
| 11,704,572 B1 | 7/2023 | Pronovost et al. | |
| 11,768,488 B2 | 9/2023 | Cella | |
| 12,002,309 B2 | 6/2024 | Simoudis | |
| 2008/0248815 A1 | 10/2008 | Busch | |
| 2009/0192851 A1 | 7/2009 | Bishop | |
| 2009/0326791 A1 | 12/2009 | Horvitz et al. | |
| 2010/0017427 A1 | 1/2010 | Johnson et al. | |
| 2011/0184974 A1 | 7/2011 | Rawal et al. | |
| 2013/0151291 A1 | 6/2013 | Salway | |
| 2013/0158866 A1 | 6/2013 | Weir et al. | |
| 2014/0009275 A1 | 1/2014 | Bowers et al. | |
| 2014/0114705 A1 | 4/2014 | Bashvitz et al. | |
| 2014/0156806 A1 | 6/2014 | Karpistsenko et al. | |
| 2014/0279012 A1 | 9/2014 | Scofield et al. | |
| 2015/0154638 A1 | 6/2015 | Burlingham et al. | |
| 2015/0161697 A1 | 6/2015 | Jones et al. | |
| 2015/0345980 A1 | 12/2015 | Subramanian et al. | |
| 2016/0003637 A1 | 1/2016 | Andersen | |
| 2016/0035150 A1 | 2/2016 | Barfield et al. | |
| 2016/0142492 A1 | 5/2016 | Fang et al. | |
| 2016/0179936 A1 | 6/2016 | Mathur et al. | |
| 2016/0195404 A1 | 7/2016 | Prasad et al. | |
| 2017/0006135 A1 | 1/2017 | Siebel et al. | |
| 2017/0046135 A1 | 2/2017 | Hazarika | |
| 2017/0059331 A1 | 3/2017 | Ni et al. | |
| 2017/0059337 A1 | 3/2017 | Barker et al. | |
| 2017/0193627 A1 | 7/2017 | Urmson et al. | |
| 2017/0195325 A1 | 7/2017 | Yamamoto | |
| 2017/0229018 A1 | 8/2017 | Levy et al. | |
| 2017/0240048 A1 | 8/2017 | Snyder | |
| 2017/0241788 A1 | 8/2017 | Chin et al. | |
| 2017/0248963 A1 | 8/2017 | Levinson et al. | |
| 2017/0337261 A1 | 11/2017 | Wang | |
| 2018/0038704 A1 | 2/2018 | Nilsson et al. | |
| 2018/0113914 A1 | 4/2018 | Mehedy et al. | |
| 2018/0114192 A1 | 4/2018 | Bryant | |
| 2018/0137593 A1 | 5/2018 | Djuric et al. | |
| 2018/0141562 A1 | 5/2018 | Singhal | |
| 2018/0150697 A1 | 5/2018 | Guttmann et al. | |
| 2018/0150893 A1 | 5/2018 | Nallu et al. | |
| 2018/0157984 A1 | 6/2018 | O'Herlihy et al. | |
| 2018/0181860 A1 | 6/2018 | Verbist et al. | |
| 2018/0292824 A1 | 10/2018 | Kazemi et al. | |
| 2019/0020973 A1* | 1/2019 | Harish | G01P 13/00 |
| 2019/0066250 A1 | 2/2019 | Levy et al. | |
| 2019/0094034 A1 | 3/2019 | Aist et al. | |
| 2019/0145779 A1 | 5/2019 | Li et al. | |
| 2019/0186939 A1 | 6/2019 | Cox et al. | |
| 2019/0213272 A1 | 7/2019 | Wong et al. | |
| 2019/0228596 A1 | 7/2019 | Mondello et al. | |
| 2019/0259223 A1 | 8/2019 | Sangameswaran et al. | |
| 2019/0266346 A1 | 8/2019 | O'Brien et al. | |
| 2019/0287032 A1 | 9/2019 | Seabolt et al. | |
| 2019/0288852 A1* | 9/2019 | Shetye | G06F 21/73 |
| 2019/0296926 A1 | 9/2019 | Palan et al. | |
| 2019/0311241 A1 | 10/2019 | Friedman et al. | |
| 2019/0376798 A1* | 12/2019 | Abramson | G01C 21/3641 |
| 2019/0377359 A1 | 12/2019 | Lanke et al. | |
| 2019/0387365 A1 | 12/2019 | Spruyt et al. | |
| 2019/0394513 A1 | 12/2019 | Shin et al. | |
| 2020/0001774 A1 | 1/2020 | Kim | |
| 2020/0057601 A1 | 2/2020 | Lenke et al. | |
| 2020/0110951 A1 | 4/2020 | Cordell et al. | |
| 2020/0182637 A1 | 6/2020 | Kumar et al. | |
| 2020/0182643 A1 | 6/2020 | Ludwig | |
| 2020/0226902 A1 | 7/2020 | Mandaric et al. | |
| 2020/0234048 A1 | 7/2020 | Rogan | |
| 2020/0250696 A1 | 8/2020 | Cordell | |
| 2020/0278693 A1 | 9/2020 | Vijaya Kumar et al. | |
| 2020/0372590 A1* | 11/2020 | Chowdhary | G06F 16/24578 |
| 2021/0009136 A1 | 1/2021 | DiMeo et al. | |
| 2021/0056778 A1 | 2/2021 | Wylie et al. | |
| 2021/0101592 A1 | 4/2021 | Kokes et al. | |
| 2021/0133810 A1 | 5/2021 | MacNeille et al. | |

FOREIGN PATENT DOCUMENTS

| | | |
|---|---|---|
| EP | 2677484 B1 | 7/2017 |
| EP | 3567475 A1 | 11/2019 |
| JP | 2003207342 A | 7/2003 |
| JP | 2005537687 A | 12/2005 |
| JP | 2008152655 A | 7/2008 |
| JP | 2013101051 A | 5/2013 |
| JP | 2018025865 A | 2/2018 |
| JP | 2020004210 A | 1/2020 |
| KR | 20100701149 B1 | 3/2007 |
| KR | 1020140134430 | 6/2015 |
| KR | 20180009882 A | 1/2018 |
| KR | 1020180074049 | 5/2018 |
| KR | 20190100895 A | 8/2019 |
| WO | 2017210222 A1 | 12/2017 |
| WO | 2018181974 A1 | 10/2018 |
| WO | 2019032519 A1 | 2/2019 |
| WO | 2019084012 A1 | 5/2019 |
| WO | 2019125446 A1 | 6/2019 |
| WO | 2020081576 A1 | 4/2020 |
| WO | 2020097221 A1 | 5/2020 |
| WO | 2021158390 A1 | 8/2021 |

OTHER PUBLICATIONS

Tanaka, K., et al., "A Destination Prediction Method Using Driving Contexts and Trajectory for Car Navigation Systems", Proceedings of the 2009 ACM Symposium on Applied Computing, SAC '09 (Association for Computing Machinery, New York, NY), pp. 190-195 (2009) [https://doi.org/10.1145/1529282.1529323].

(56) References Cited

OTHER PUBLICATIONS

Unknown author (2018) The Case for a Deep Learning Computer Vision Platform, Product Whitepaper. Allegro, pp. 1-26.
Dilworth, J. (2017) Kinetica and NVIDIA Open Door for Fast Analysis of Large Geospatial Datasets. NVIDIA Blog, pp. 1-13.
Hu, M., et al. (2017) Decision Tree-Based Maneuver Prediction for Driver Rear-End Risk-Avoidance Behaviors in Cut-In Scenarios. Hindawi, Journal of Advanced Transportation, vol. 2017, Article ID 7170358, pp. 1-12.
Lipinsky, M. (2019) On the Way to One Volkswagen Automotive Platform, pp. 1-15.
International Search Report mailed Apr. 9, 2020 issued in PCT Application No. PCT/US2019/060094, pp. 1-4.
Reddy, M. (2019) Euclid: Blueprint to Create End-to-End AI Application Pipelines. The Hive in the Hive, pp. 1-5.
Yin, H., et al. (2017) When to Use What Data Set for Your Self-Driving Car Algorithm: An Overview of Publicly Available Driving Datasets. IEEE 20th International Conference on Intelligent Transportation Systems (ITSC), pp. 1-8.
European Supplementary Search Report dated Jun. 17, 2022 issued in EP Application No. EP19881207.5, p. 1.
Boland, M. (2019) Is Uber Local Advertising's Duopoly Killer? Street Fight, pp. 1-3.
Hawkins, A. (2018) GM's Data Mining is Just the Beginning of the In-Car Advertising Blitz. The Verge, pp. 1-5.
Hu, C. (2018) What Does Music Have to Gain From the Future of Transportation? More Than You Might Think. Forbes, pp. 1-10.
Lee, S., et al. (2016) Next Place Prediction Based on Spatiotemporal Pattern Mining of Mobile Device Logs. Sensors, 1-19.
O'Kane, S. (2019) The Head of Android Auto on How Google will Power the Car of the Near Future. The Verge, pp. 1-17.
International Search Report mailed Apr. 6, 2020 issued in PCT Application No. PCT/US2019/056352, pp. 1-3.
Thompson, S., et al. (2019) Twelve Million Phones, One Dataset, Zero Privacy. The New York Times, pp. 1-31.
Unknown author (2019) Uber Privacy Notice, pp. 1-19.
Wiggers, K. (2018) Buick and Yelp Partner to Offer Restaurant Reservations in Cars, Trucks, and Crossovers. Venture Beat, pp. 1-5.
Unknown author (2018) Personalization on the Edge. XEVO, pp. 1-8.
Xia, L., et al. (2018) Decision Tree-Based Contextual Location Prediction from Mobile Device Logs. Hindawi, Mobile Information Systems, vol. 2018, Article ID 1852861, pp. 1-12.
International Search Report mailed May 21, 2021 issued in PCT Application No. PCT/US2021/015020, pp. 1-3.
Muller, J. (2021) What's Next: A Digital Butler for Your Car. AXIOS, pp. 1-7.
European Supplementary Search Report dated May 31, 2022 issued in EP Application No. EP19873309.9, p. 1.
International Search Report mailed Nov. 25, 2021 issued in PCT Application No. PCT/US2021/046303, pp. 1-3.
International Search Report mailed Jan. 20, 2022 issued in PCT Application No. PCT/US2021/052310, pp. 1-3.

\* cited by examiner

FIG. 21

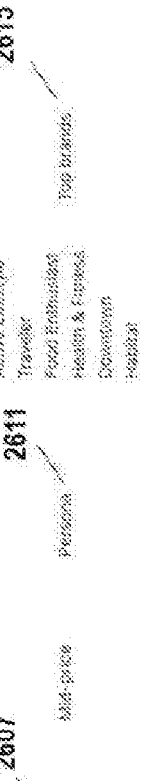
FIG. 26

SYSTEMS AND METHODS FOR PERSONALIZED GROUND TRANSPORTATION PROCESSING AND USER INTENT PREDICTIONS

CROSS-REFERENCE

This application is a continuation application of International Patent Application No. PCT/US2021/015020, filed Jan. 26, 2021, which claims priority to U.S. Provisional Application No. 62/969,472, filed Feb. 3, 2020, each of which is incorporated herein by reference in its entirety.

BACKGROUND

The rapid expansion in the computing capability of mobile computing devices, such as smartphones, tablet computers and other portable devices, and the growth in the number and advancement of software program applications (or "apps") for mobile devices, has greatly increased the dependence of individuals on devices, apps and related platforms in the field of personal productivity. For example, apps are widely used for scheduling meetings, determining travel routes, selecting transit modes, and other functions.

The emergence, and acceptance, of mobility services such as consumer adoption of peer-to-peer car sharing and ride-hailing services (e.g., Uber® and Lyft®) has encouraged a combination of transportation and mobile applications. Next-generation mobility is about autonomous and automated vehicles, electrified vehicles, and on-demand shared mobility and the use cases they enable. Autonomous vehicles that are capable of operation without human intervention are rapidly improving. As such vehicles become autonomous or automated, commercial and transactional opportunities may be presented passengers or users during transportation.

SUMMARY

Recognized herein is a need for methods and systems for providing products or services for use with vehicles, such as fully autonomous, pilotless vehicles. Beneficially, such products or services may facilitate savings in both time and resources for users of the vehicles. Additionally, it can allow companies offering those products or services to more directly engage with end consumers in a personalized manner within a vehicular transportation environment.

The present disclosure provides systems and methods for generating a personalized transportation-centric experience with customized monetizable driver- and/or passenger-centric services. For example, systems and methods of the present disclosure may be used or configured to predict an intent or destination of a trip based on limited location data. The personalized transportation-centric experience can be provided with any transportation mode, such as, for example, autonomous vehicle, ride-hailing service, fleet-based services, microtransit (e.g., fleet-based demand responsive transit), rail transportation, and/or terrestrial mass transit vehicle. An intent or destination of a trip may be generated, predicted, estimated or determined using a machine learning system with minimal human intervention. The provided systems and methods may allow for a range of new use cases for pilotless/driverless vehicles in industries such as hotels and hospitality, restaurants and dining, tourism and entertainment, healthcare, service delivery, and the like.

In an aspect, a method for predicting a trip intent or destination while a user is traveling along a route is provided. A user of the provided systems/methods may be a driver, service driver such as a driver of a ride-hailing service, a passenger, or any user who is transported by a vehicle. The method may comprise: (a) receiving a starting geographic location of the route and data about a profile of the user; (b) retrieving a trained classifier based at least in part on the data about the profile of the user; (c) using the trained classifier to predict the trip intent or destination based on the starting geographic location; and (d) while the user is traveling in a vehicle along at least a portion of the route, presenting one or more transactional options to the user on an electronic device, wherein the one or more transactional options are identified based on the trip intent or destination predicted in (c).

In some embodiments, the starting geographic location is received in a form of Global Positioning System (GPS) data. In some embodiments, the starting geographic location is determined using in part a geographic location of the electronic device, which geographic location is determined by a global position system or signal triangulation. In some embodiments, the starting geographic location is entered by the user via a graphical user interface (GUI) on the electronic device.

In some embodiments, the unsorted geospatial data comprises uncorrelated GPS data. In some cases, the one or more training datasets comprise labeled data obtained using clustering analysis of a plurality of trip data records. In some instances, the method further comprises generating the plurality of trip data records by associating the unsorted or uncorrelated GPS data with one or more person identities. In some instances, the plurality of trip data records is augmented by social data, transportation data, or purchase data of the corresponding person identity.

In some embodiments, training the classifier comprises creating labels for a segment of trip based on one or more labeling rules. In some embodiments, the method further comprises predicting a transportation mode for one or more portions of the travel route. In some cases, the transportation mode comprises autonomous vehicle, ride-hailing service, rail transportation, and/or terrestrial mass transit vehicle. In some embodiments, the method further comprises updating the trip intent or destination upon receiving new location data during the trip.

Another aspect of the present disclosure provides a non-transitory computer readable medium comprising machine executable code that, upon execution by one or more computer processors, implements any of the methods above or elsewhere herein.

Another aspect of the present disclosure provides a system predicting a trip intent or a destination of a user. The system comprises one or more computer processors and computer memory coupled thereto. The computer memory comprises machine executable code that, upon execution by the one or more computer processors, implements any of the methods above or elsewhere herein. In some embodiments, the one or more processors are configured to execute the set of instructions to: (a) receive a starting geographic location of a travel route and data about an identity of the user; (b) train a classifier based at least in part on (i) the data about the identity of the user and (ii) one or more training datasets comprising unsorted geospatial data; (c) use the classifier trained in (b) to predict the trip intent or the destination based at least in part on the starting geographic location; and (d) while the user is traveling in a vehicle along at least a portion of the travel route, present one or more transactional options to the user on an electronic device, wherein the one or more transactional options are identified based at least in part on the trip intent or destination predicted in (c).

In some embodiments, the starting geographic location is received in a form of Global Positioning System (GPS) data. In some embodiments, the starting geographic location is determined using in part a geographic location of the electronic device, which geographic location is determined by a global position system or signal triangulation. In some embodiments, the starting geographic location is entered by the user via a graphical user interface (GUI) on the electronic device.

In some embodiments, the unsorted geospatial data comprises uncorrelated GPS data. In some cases, the one or more training datasets comprise labeled data obtained using clustering analysis of a plurality of trip data records. In some instances, the one or more processors are further configured to generate the plurality of trip data records by associating the unsorted or uncorrelated GPS data with one or more person identities. In some instances, the plurality of trip data records is augmented by social data, transportation data, or purchase data of the corresponding person identity. In some embodiments, the one or more processors are configured to train the classifier by creating labels for a segment of trip based on one or more labeling rules. In some embodiments, the one or more processors are further configured to predict a transportation mode for one or more portions of the travel route. In some cases, the transportation mode comprises autonomous vehicle, ride-hailing service, rail transportation, and/or terrestrial mass transit vehicle. In some embodiments, the one or more processors are further configured to update the trip intent or destination upon receiving new location data during the trip.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 21 shows examples of augmented trip dataset processed by the system and methods described herein.

FIG. 26 and FIG. 27 show examples of insight data about an individual.

DETAILED DESCRIPTION

Figure 1:
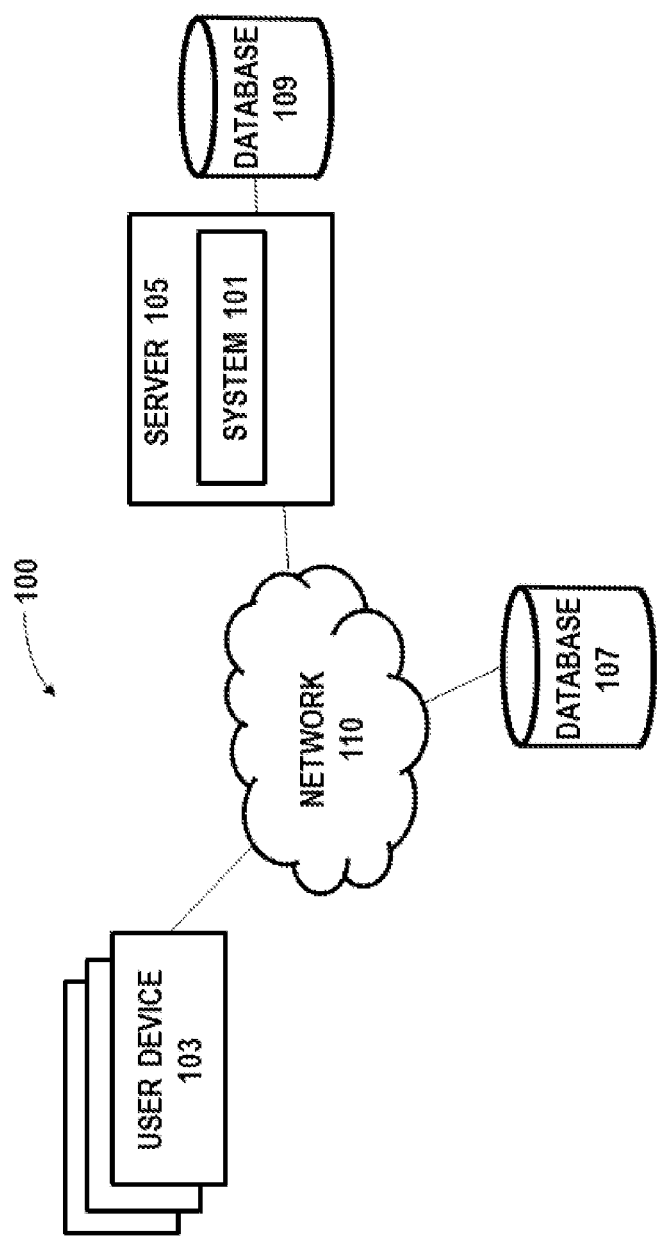
FIG. 1 schematically shows an example of a network environment in which a personal transportation management and intent prediction system may be operated, in accordance with some embodiments.

While various embodiments have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments described herein may be employed.

As used herein, the terms "autonomously controlled", "self-driving", "autonomous", and "pilotless," when used in describing a vehicle, generally refer to a vehicle that can itself perform all driving tasks and monitor driving environment along at least a portion of a route. An autonomous vehicle may travel from one point to another without any intervention from a human onboard the autonomous vehicle. In some cases, an autonomous vehicle may refer to a vehicle with capabilities as specified in the National Highway Traffic Safety Administration (NHTSA) definitions for vehicle automation, and specifically Level 4 of the NHTSA definitions, "an Automated Driving System (ADS) on the vehicle can itself perform all driving tasks and monitor the driving environment—essentially, do all the driving—in certain circumstances. The human need not pay attention in those circumstances," or Level 5 of the NHTSA definitions, "an Automated Driving System (ADS) on the vehicle can do all the driving in all circumstances. The human occupants are just passengers and need never be involved in driving." In some cases, an automated vehicle may refer to a vehicle with capabilities specified in the Level 2 of the NHTSA definitions, "an advanced driver assistance system (ADAS) on the vehicle can itself actually control both steering and braking/accelerating simultaneously under some circumstances. The human driver must continue to pay full attention ("monitor the driving environment") at all times and perform the rest of the driving task," or Level 3 of the NHTSA definitions, "an Automated Driving System (ADS) on the vehicle can itself perform all aspects of the driving task under some circumstances. In those circumstances, the human driver must be ready to take back control at any time when the ADS requests the human driver to do so. In all other circumstances, the human driver performs the driving task." The automated vehicle may also include those with Level 2+ automated driving capabilities where AI is used to improve upon Level 2 ADAS, while consistent driver control is still required.

The term "passenger vehicle," as used herein, generally refers to a vehicle used for passengers, such as a car or a truck, but excluding mass transit vehicles.

The term "mass transit vehicle," as used herein, generally refers to a multi-passenger vehicle, such as a train or a bus, which can transport a group or groups of passengers.

As used herein, the term "trip" generally refers to the total time and/or route(s) taken from a first location to a second location. A trip may include one or more routes. The term "route" generally refers to a set of one or more directions that permit a user to travel from the first location to the second location. A route can have one or more segments. A segment may refer to a part of portion of a route between an embarkation point and a disembarkation point.

The term "contextual information," as used herein, generally refers to any information associated with a geographic location and/or an event. Contextual information may be derived from information indicative of or related to such geographic location and/or event.

The term "labeled data" or "labeled dataset," as used herein, generally refers to a paired dataset used for training a model using supervised learning. Methods provided herein may utilize intent or destinations extracted by clustering analysis ground mobility analysis and destination/intent prediction system as part of the labeled dataset. Alternatively, methods provided herein may utilize an un-paired training approach allowing a machine learning method to train and apply on existing datasets that may be available with an existing system.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The terms "a," "an," and "the," as used herein, generally refers to singular and plural references unless the context clearly dictates otherwise.

The present disclosure provides systems and methods that may be used or configured to perform ground mobility analysis and predict destination/intent of a trip for one or more users. Systems and methods of the present disclosure may be used or configured to predict intent and/or destination of a user based at least in part on location data such as Global Positioning System (GPS) data. In some cases, the predicted destination may be used to further generate a personalized transportation plan for a user, for example, directing the user (e.g., driver) to take a particular route in order to avoid an accident, to process, recommend, and/or present personalized mobility data, routing data, scheduling data, traffic data, and other forms or types of data to the user. In some instances, machine learning techniques can be utilized to predict the intent or destination of a trip. In some instances, machine learning techniques can also be utilized to create a personalized transportation plan that includes the predicted intent/destinations, travel schedules (e.g., begin time, end time), options for transaction-based purchase of goods, services, and content during transportation, types of vehicles (e.g., types of autonomous vehicles such as sedans or vans, brands), types of transportation modes (e.g., autonomous vehicle, public transportation (such as train, light rail, or city bus), shuttle, ride-sharing, ride-hailing, shared trip or private trip, walking, bicycle, e-scooter, taxi, etc.), and others.

The intent/destination prediction capability can be utilized or implemented in a driver- and/or passenger-monetization platform. Driver and/or passenger monetization may include, for example, activities and services related to: a) transaction-based purchase of goods, e.g., gasoline, food, coffee, services, parking, and content relevant to a predicted intent or destination (e.g., a podcast about an artist's work exhibited at the museum that is the driver's or passenger's destination), while being transported, b) subscriptions to access content, e.g., an annual subscription to a music streaming service, a news service, a concierge service, etc.; c) transaction-based purchase of goods, services, and content while being transported, as well as when vehicles intermittently stop, such as at refueling stations, restaurants, coffee shops, etc. (e.g., a recharging station operator, such as an energy company, can partner with a coffee shop chain to offer discounts in coffee drinks to passengers who purchase while refueling a vehicle); and d) redemption of loyalty points, e.g., automakers and mobility services fleet operators can reward their customers for their loyalty, using a system similar to that used by airlines or hotel chains where the loyalty points can be redeemed in much the same way these and other industries use such programs.

Artificial intelligence, including machine learning algorithms, may be used to train a predictive model for predicting a trip intent or destination. A machine learning algorithm may be a neural network, for example. Examples of neural networks that may be used with embodiments herein may include a deep neural network, convolutional neural network (CNN), and recurrent neural network (RNN). In some cases, a machine learning algorithm trained model may be pre-trained and implemented on the user device or the ground mobility analysis and destination/intent prediction system, and the pre-trained model may undergo continual re-training that may involve continual tuning of the predictive model or a component of the predictive model (e.g., classifier) to adapt to changes in the implementation environment over time (e.g., changes in the customer/user data, sensor data, model performance, third-party data, etc.).

Methods and Systems for Ground Mobility Analysis and Destination/Intent Prediction The present disclosure provides systems and methods that may be used or configured to perform ground mobility analysis and predict destination/intent of a trip for one or more users. Systems and methods of the present disclosure may be used or configured to predict intent and/or destination of a user based at least in part on location data. In some embodiments, the location data may include Global Positioning System (GPS) data. The GPS data may be unsorted data or may be uncorrelated with users (e.g. de-identified data). The presented systems and methods may process the unsorted location data and identify an intent or destination of a trip associated with a user. The trip, and the corresponding user and intent may be used to generate a training dataset for training a classifier for determining/inferring a trip intent or destination upon deployment. The trip intention and/or destination may be predicted during a trip based on real-time location data or limited location data (e.g., location of a trip starting location). Alternatively or additionally, the intention and/or destination may be predicted for a new/next trip prior to starting of a trip.

A user may be pre-registered with the system herein or subscribed to one or more mobility services provided by the system herein. A user may be a prospective requestor for a mobility service. A user may utilize a user mobile application to receive transactional options provided by the system during a trip. The application can provide one or more transactional services or monetizable driver- and/or passenger-centric service options to the user based on the predicted intent or destination. A user may be presented with services or transactional offers relevant to the predicted intent or destination via the application. A user may access services or conduct transactions during the trip via the application. A user may be transported from a first location to a second location with the use of, and/or while having access to, one or more services including mobility services and user experience services provided by the system during the trip. A user of the provided systems/methods may be a driver, service driver such as a driver of a ride-hailing service, a passenger, or any user who is transported by a vehicle as described above.

FIG. 1 schematically illustrates an example of a network environment 100 in which a ground mobility analysis and destination/intent prediction system 101 may be operated. The ground mobility analysis and destination/intent prediction system 101 may interact with a plurality of user devices 103 through one or more networks 110. The ground mobility analysis and destination/intent prediction system 101 may be coupled to or a part of a personal transportation platform for providing a personalized transportation experience including offering personalized services/products during the travel. In some embodiments, a user device of the plurality of user devices 103 may be a device associated with a user. In some embodiments, a user device may be used by a plurality of users. For example, a user device may be a built-in device or system inside or coupled to a vehicle. In some embodiments, two or more user devices may be associated with a single user.

In some embodiments, the ground mobility analysis and destination/intent prediction system 101 may be configured to provide a user interface for a user to view a travel route or interact with one or more transactional options relevant to a predicted trip intent/destination during a trip via a user device 103. In some cases, the user interface may comprise a GUI rendered on the user device or on a display in the vehicle. The ground mobility analysis and destination/intent prediction system may be configured to predict a trip intent or destination based on limited location data such as the trip starting location. The trip intent or destination can be generated using a machine learning based model based on limited location data (e.g., GPS data of a trip start location) and/or person data (e.g., person ID). The ground mobility analysis and destination/intent prediction system may be configured to predict the intent/destination of a trip based on limited real-time data with improved prediction accuracy. The prediction of the trip intent or destination may be dynamically updated and/or improved as the trip progresses. Details about the intent and destination prediction are described later herein.

In some cases, the ground mobility analysis and destination/intent prediction system may be coupled to a personal transportation plan system, that is configured to generate a personalized transportation plan including a travel route, schedule of departure time and arrival time of one or more segments or at one or more stops during the travel, transportation mode (e.g., type of transportation, type/brand of vehicles, configuration of a vehicle, etc.) for a segment of the travel route, and one or more services or monetizable driver- and/or passenger-centric service (e.g., digital service, transactional events or business activities relevant to the destination) during the travel. In some instances, the personalized transportation plan may also include transporting the user through at least one segment using an autonomous vehicle. In some cases, the personalized transportation plan or at least part of the personalized transportation plan (e.g., transportation mode) may be dynamically updated based on the updated prediction of the trip intent/destination.

The personalized transportation plan may be generated based on data related to the user and/or data related to transactional services. The data related to the user may include person identity (ID), historical data such as user preferences, transportation history, or purchase history. Such data may be collected from a variety of data sources such as mobile applications (e.g., mapping application, navigation application, email, text messages, social network app, personal health apps, etc.), social network software, third-party service providers such as mobility service providers (e.g., Uber® and Lyft®), vendors, business entities (e.g., fast food, restaurants, coffee shops, hospitality, convenience stores, refueling stations, theaters, etc.), content providers (e.g., Apple Music®, video, games, etc.), digital virtual assistant, smart home device such as Alexa®, interactive voice response (IVR) systems, social media channel and messenger APIs such as Facebook® channel, Twilio SMS channel, Skype® channel, and various other sources. Data related to transactional services may include a rejection or acceptance of a prior transactional service by the user or data from third-party service providers. The personalized transportation plan can be generated using a machine learning based model based at least in part on the predicted intent or destination. The input data may be data derived from the variety of data as described above. For instance, the input data may include social graph, purchase graph, transportation graph, demographic information, weather data, vender or service provider catalogs and various others. The output of the model may be a travel route, schedule of one or more segments of the travel route (e.g., departure time, arrival time, etc.), a transportation mode for each segment (e.g., vehicles, types of a car), and one or more transactional options or services during the travel. In some cases, a transactional offer may be provided by the system to a user in real-time. For example, upon receiving a user input indicative of rejection on a service offer, a new transactional offer may be selected and provided to the user in real-time.

Real-time, as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event.

The ground mobility analysis and destination/intent prediction system 101 may comprise one or more servers 105 and one or more database systems 107, 109, which may be configured for storing or retrieving relevant data. Relevant data may comprise processed GPS data, trip data, augmented trip data, augmented personal data records (labeled with additional data related to trip intent, trip type, user segmentation, etc.), user profile data (e.g., user preferences, personal data such as identity, age, gender, contact information, demographic data, ratings, etc.), historical data (e.g., social graph, transportation history, transportation subscription plan data, purchase or transaction history, loyalty programs, and various other data as described elsewhere herein. In some cases, the ground mobility analysis and destination/intent prediction system 101 may source data or otherwise communicate (e.g., via the one or more networks 110) with one or more external systems or data sources, such as one or more location data service, ontology knowledge base, map, weather, or traffic application program interface (API) or map database. In some instances, the ground mobility analysis and destination/intent prediction system 101 may retrieve data from the database systems 107, 109 which are in communication with the one or more external systems (e.g., location data sources, mobility service providers, autonomous vehicle dispatching system, third-party monetizable driver- and/or passenger-centric service entities such as fast food, restaurants, coffee shops, hospitality, convenience stores, refueling stations, theaters, digital service providers, etc.). In some cases, the database may be a synchronization database that maintains tables or records for information such as weather, traffic, public transit, Global Positioning System (GPS) input or logs, planning data, personal data and other data obtained from external data sources.

Each of the components (e.g., servers, database systems, user devices, external systems, and the like) may be operatively connected to one another via one or more networks 110 or any type of communication links that allows transmission of data from one component to another. For example, the respective hardware components may comprise network adaptors allowing unidirectional and/or bidirectional communication with one or more networks. For instance, the servers and database systems may be in communication—via the one or more networks 110—with the user devices 103 and/or data sources to transmit and/or receive relevant data.

A server (e.g., servers 105) may include a web server, a mobile application server, an enterprise server, or any other type of computer server, and can be computer programmed to accept requests (e.g., HTTP, or other protocols that can initiate data transmission) from a computing device (e.g., user device, other servers) and to serve the computing device with requested data. A server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The one or more databases 107, 109 may utilize any suitable database techniques. For instance, structured query language (SQL) or "NoSQL" database may be utilized for storing the processed/raw GPS data, user profile data, historical data, predictive model or algorithms used for predicting a trip intent/destination, map or other data. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the ground mobility analysis and destination/intent prediction system 101 may construct the database in order to deliver the data to the users efficiently. For example, the ground mobility analysis and destination/intent prediction system 101 may provide customized algorithms to extract, transform, and load (ETL) the data. In some embodiments, the ground mobility analysis and destination/intent prediction system 101 may construct the databases using proprietary database architecture or data structures to provide an efficient database model that is adapted to large scale databases, is easily scalable, is efficient in query and data retrieval, or has reduced memory requirements in comparison to using other data structures.

The one or more databases (e.g., augmented person database) can be accessed by a variety of applications or entities that may be related to transactions, though in some situations such variety of applications or entities may not be related to transactions. In some cases, data stored in the augmented person database can be utilized or accessed by other applications through application programming interfaces (APIs). The data accessed by the variety of applications may include the predicted intent/destination, predicted transportation mode, and/or data managed by the system such as person data records. Access to the database may be authorized at per API level, per data level (e.g., type of data), per application level or according to other authorization policies.

The ground mobility analysis and destination/intent prediction system 101 may be implemented anywhere in the network. The ground mobility analysis and destination/intent prediction system 101 may be implemented on one or more servers in the network, in one or more databases in the network, one or more electronic devices built in or coupled to a vehicle, or one or more user devices. For example, the ground mobility analysis and destination/intent prediction system 101 may be implemented in a distributed architecture (e.g., a plurality of devices collectively performing together to implement or otherwise execute the ground mobility analysis and destination/intent prediction system 101 or its operations) or in a duplicate manner (e.g., a plurality of devices each implementing or otherwise executing the ground mobility analysis and destination/intent prediction system 101 or its operations as a standalone system). The ground mobility analysis and destination/intent prediction system 101 may be implemented using software, hardware, or a combination of software and hardware in one or more of the above-mentioned components within the network environment 100.

A user device of the plurality of user devices 103 may be an electronic device. The user device may be a computing device configured to perform one or more operations consistent with the disclosed embodiments. Examples of user devices may include, but are not limited to, mobile devices, smartphones/cellphones, tablets, personal digital assistants (PDAs), smart wearable devices, smart watches, laptop or notebook computers, desktop computers, media content players, television sets, video gaming station/system, virtual reality systems, augmented reality systems, microphones, or any electronic device configured to enable the user to view the travel route, and interact with the transaction or service related information, and display other information as it relates to the travel, for example. The user device may be a handheld object. The user device may be portable. The user device may be carried by a human user. In some cases, the user device may be located remotely from a human user, and the user can control the user device using wireless and/or wired communications. The user device may be a computing device in communication with a wearable device worn by a user. In some cases, the wearable device may be configured to monitor user activities, vital signs (e.g., blood pressure and heart rate) or health conditions of a user. In some cases, the user device may be an electronic device coupled to or located on-board a vehicle.

In some embodiments, the user device may be capable of detecting a location of the device/user. The user device may have one or more sensors on-board the device to provide instantaneous positional or location information of the user device. In some embodiments, the instantaneous location information may be provided by sensors such as a location sensor (e.g., Global Positioning System (GPS)), inertial sensors (e.g., accelerometers, gyroscopes, inertial measurement units (IMUs)), altitude sensors, attitude sensors (e.g., compasses) pressure sensors (e.g., barometers), field sensors (e.g., magnetometers, electromagnetic sensors), and/or other sensor information (e.g., WiFi data). The location of the user device can be used to locate an origin of a travel route. As an addition or alternative, a location of a place of interest (e.g., origin of a trip, stops during a trip) may be provided by a user via the user device 103 such as by manually entering a location via a user interface.

The user device may include a communication unit, which may permit the communications with one or more other components in the network. In some instances, the communication unit may include a single communication module, or multiple communication modules. In some instances, the user device may be capable of interacting with one or more components in the network environment using a single communication link or multiple different types of communication links. The user devices 103 may interact with the ground mobility analysis and destination/intent prediction system 101 by requesting and obtaining the aforementioned data via the network 110.

The user device may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations.

In some embodiments, users may utilize the user devices 103 to interact with ground mobility analysis and destination/intent prediction system 101 by way of one or more software applications (i.e., client software) running on and/or accessed by the user devices, wherein the user devices 103 and the ground mobility analysis and destination/intent prediction system 101 may form a client-server relationship. For example, the user devices 103 may run dedicated mobile applications provided by the ground mobility analysis and destination/intent prediction system 101.

In some embodiments, the client software (i.e., software applications installed on the user devices 103) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms. In some cases, third-party user interfaces or APIs may be integrated to the mobile application and integrated in the front-end user interface (e.g., within a graphical user interface). The third-party user interfaces may be hosted by a third party server. The third-party server may be provided by a range-of third-party entities such as original equipment manufacturers (OEMs), hotels and hospitality, restaurants and dining, tourism and entertainment, service delivery, and various others as described elsewhere herein. In some cases, APIs or third-party resources (e.g., map service provider, mobility service provider, digital service provider, Starbucks, McDonalds, Ticketmaster, etc.) may be used to provide and conduct a transaction with the user. In some cases, one or more third-party services may be called by the ground mobility analysis and destination/intent prediction system 101 and integrated to the user application such that a user may access such services in a familiar front-end user experience. In some cases, one or more of the aforementioned services may be a built-in component of ground mobility analysis and destination/intent prediction system 101 and may be provided to the user without outsourcing a third-party entity. In some cases, data retrieved from the third-party service providers may be organized and stored by the ground mobility analysis and destination/intent prediction system 101 to form a vendor/service catalog which may be used to determine a transactional offer relevant to a predicted intent to the user during transportation. In some cases, the ground mobility analysis and destination/intent prediction system 101 may provide a graphical user interface (GUI). The GUI may permit the user to access, accept, reject, select one or more transactional offers/options, information, services relevant to a predicted destination by interacting with graphical elements, and viewing information such as a travel route and travel schedule during the transportation.

The user device may include a display. The display may be a screen. The display may be a touchscreen. As an alternative, the display may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). For example, the GUI may show graphical elements that permit a user to accept or reject a transactional offer, and view information related to a predicted intent/destination, a travel route and transaction options.

The network 110 may be a communication pathway between the personal transportation management system 101, the user devices 103, and other components of the network. The network may comprise any combination of local area and/or wide area networks using both wireless and/or wired communication systems. For example, the network 110 may include the Internet, as well as mobile telephone networks. In one embodiment, the network 110 uses standard communications technologies and/or protocols. Hence, the network 110 may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

Systems for predicting a destination or intention of a trip may comprise a plurality of components as described and shown herein. FIG. 2 through FIG. 18 schematically illustrate various components of the system that are configured to perform functions and operations to collectively predict a destination or intention based on limited location data. In some embodiments, the various components of the system may comprise a trip identification engine, a Point-of-Interest (POI) assignment engine, a device identifier (ID) to person ID converter, a person data augmentation engine, an automatic trip labeling engine, an machine learning (ML) clustering system, a person segmentation engine, databases and various other components.

Figure 2:
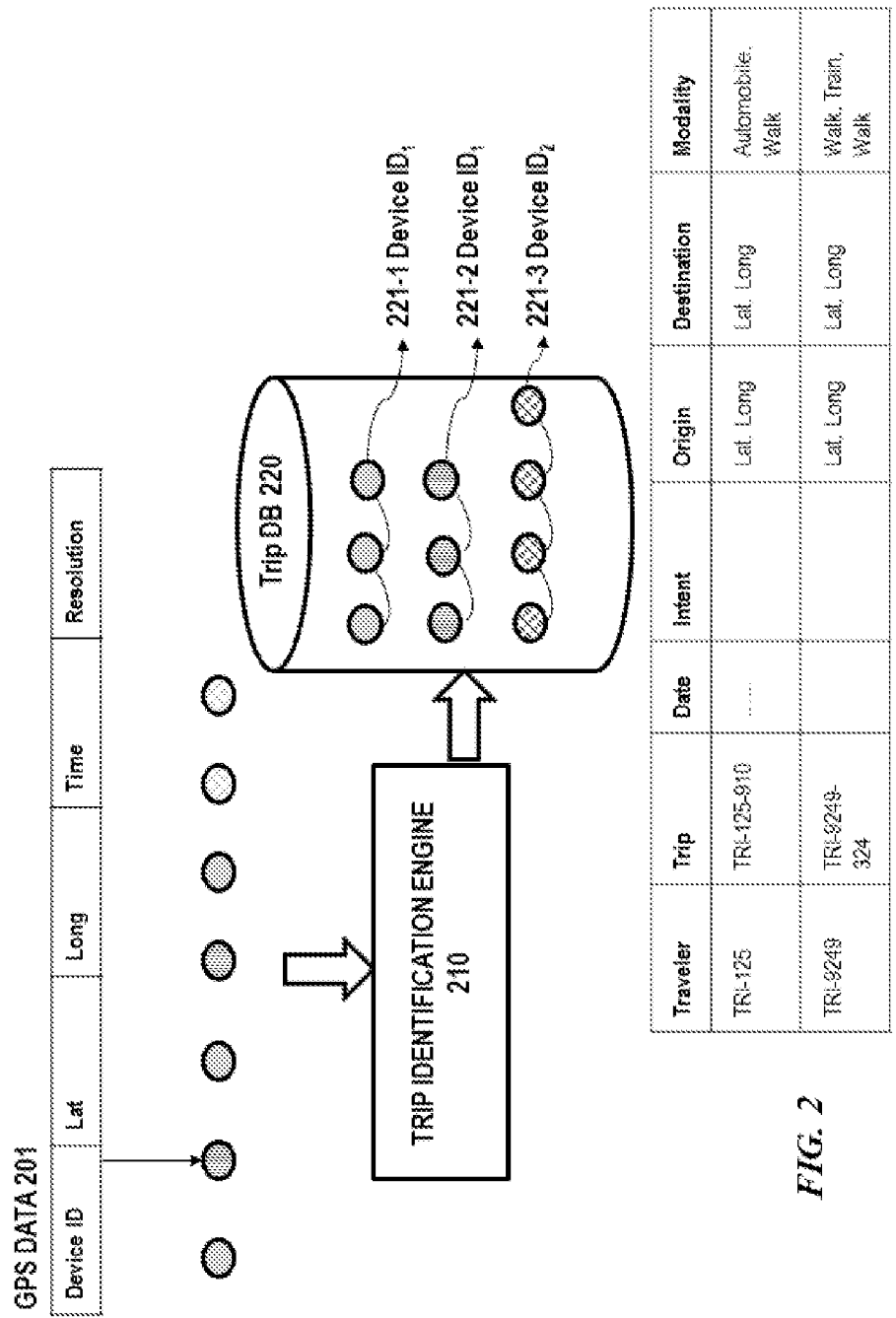
FIG. 2 schematically illustrates a trip identification engine configured to process location data, in accordance with some embodiments.

In some embodiments, one or more components of the system (e.g., trip classifier) may be developed using unsorted or uncorrelated location data. In some embodiments, person data records generated and managed by the ground mobility analysis and destination/intent prediction system may comprise data extracted from the unsorted or uncorrelated location data. In some cases, the unsorted or uncorrelated location data may be processed by a trip identification engine of the system to output a plurality of individual trips. FIG. 2 schematically illustrates a trip identification engine 210 for processing location data, in accordance with some embodiments.

In some embodiments, the location data 201 may comprise GPS data. In some cases, the GPS data may comprise a plurality of records or datasets containing corresponding GPS information. For example, a table may be maintained with entries for each record containing the corresponding coordinates data (e.g., latitude, longitude), timestamp, resolution and other information such as device ID. The data entry of a location record may comprise any suitable data structures. For instance, the data structure may comprise a plurality of data fields as described above. The data structure may depend on the raw data format or the data source from which the data is retrieved.

The location data 201 may be retrieved from one or more data sources. The location data may be obtained utilizing suitable location-based technologies such as Global Navigation Satellite System (GNSS), cellular triangulation, assisted-GPS (A-GPS), differential global positioning system (DGPS), and the like.

In some embodiments, the location data may comprise at least geographic location information and an identifier such as a device ID. Depending on the data source, the identifier may be, for example, Identifier for Advertising (IDFA), or Android Advertising ID (AAID).

The plurality of records of the location data may be obtained from the one or more data sources in streams or in batch. The location data may be time series data such as spatio-temporal point measurements. In some cases, the plurality of records or datasets of the location data may be unsorted that may not be streamed in or organized in time series. The plurality of records or datasets may be associated with a plurality of trips associated with one or more devices/persons. In some cases, the plurality of records or datasets of the location data may not comprise explicit information about a person, or a trip.

The location data may be processed by the trip identification engine 210 for identifying one or more individual trips 221-1, 221-2, 221-3. In some cases, the one or more individual trips may be stored in a Trip database 220. A trip may comprise a sequence of ordered location data records comprising at least a location dataset corresponding to an origin of a strip and a location dataset corresponding to a destination of a trip. A trip may be identified from the plurality of location datasets using any suitable methods such that trip information including an origin geographic location/start time of a trip, a destination geographic location/end time of a trip, and a Device ID that the trip is associated with is identified. One or more unique trips may be identified and associated with a Device ID. For instance, different trips 221-1, 221-2, at different start/end times points may be identified and associated with the same Device ID.

Figure 3:
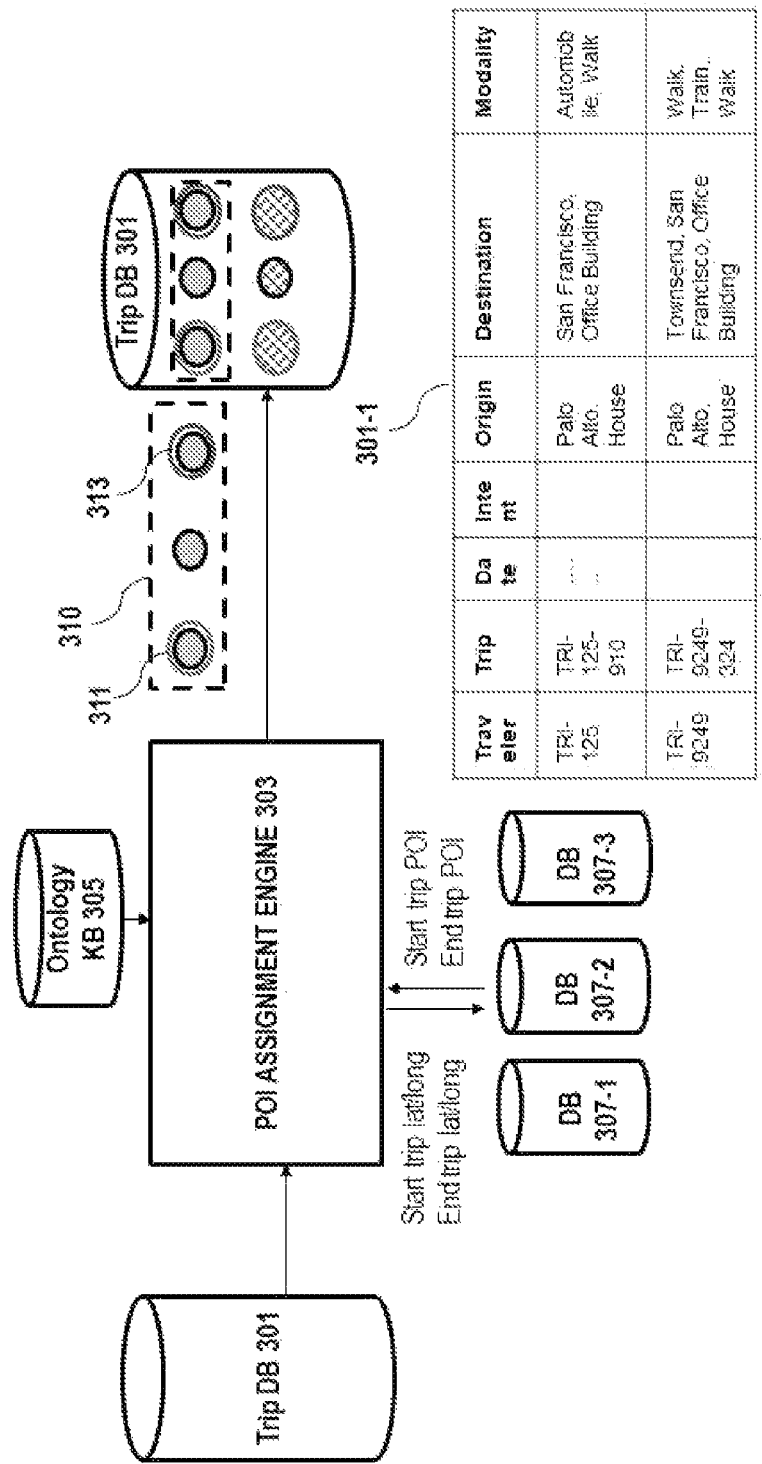
FIG. 3 shows a point-of-interest (POI) assignment engine of the system, in accordance with some embodiments.

In some embodiments, the geographic location of the origin and/or destination of a trip may be assigned a location contextual data such as points of interest (POIs). FIG. 3 shows a POI assignment engine 303 of the system, in accordance with some embodiments. The POI assignment engine 303 may be coupled to the Trip database 301 for assigning location contextual data to at least the origin and the destination of an individual trip. In some cases, one or more intermediate location points (e.g., intermediate stops) in a trip may be assigned location contextual data. Such location contextual data may be associated with the identity of the destination, origin or stops along the trip. The location contextual data may include, for example, a coffee shop, airports, venues, restaurant, stadium, theater, dental clinic and the like. The Trip database 301 can the same as the trip database as described in FIG. 2.

In some cases, the POI assignment engine may retrieve one or more trips from the Trip database 301 and assign the location contextual data collected using a crowd sourcing approach. For instance, the POI assignment engine may be coupled to one or more third-party data sources 307-1, 307-2, 307-3, for collecting local business, landmark and point of interest (POI) data. As an example, a POI data may have a geo-tags associated therewith, and the POI assignment engine may search over the POI data to find a good match with the origin or destination geographic-coordinates (e.g., start trip lat/long, end trip lat/long) of a trip. A POI data with the best match (e.g., start trip POI, end trip POI) may be returned.

In some cases, the one or more third-party data sources 307-1, 307-2, 307-3 may be selected over other data sources for providing the POI data. For example, when multiple candidate POIs are associated with the same location or address, the system may select one POI from the plurality of candidate POIs based on a selection criteria. In some instances, the selection criteria may be user-specific. For instance, a POI may be selected from the multiple candidate POIs based on historical user data (e.g., transportation, purchase, and/or transaction history of the user, social activity of the user, etc.). Alternatively or in addition to, the POI data may be a combination of the multiple candidate POIs. For instance, the POI data may be an aggregates information (e.g., street names, landmark references, area names, etc.) about all the POIs belonging to the same geolocation point. In other instances, a POI with unstructured addresses that do not follow any format such as "suite number, street name, area code" may be supplemented by the information of other POIs belonging to the same geographical location.

In some cases, the location contextual data may be augmented by various other data sources such as ontology knowledge base 305. For instance, some POIs may be supplemented with additional attributes (e.g., airport has terminal number, airlines in terminal) provided by the ontology knowledge base. The ontology knowledge base 305 can be developed manually by one or more individuals, organizations, imported from external systems or resources, or may be partially learned using machine learning systems that collaborate with users (e.g., extracting transportation terms from natural language text). The trip dataset 310 supplemented with the POI data 311, 313 may then be ingested back to the Trip database 301.

Figure 4:
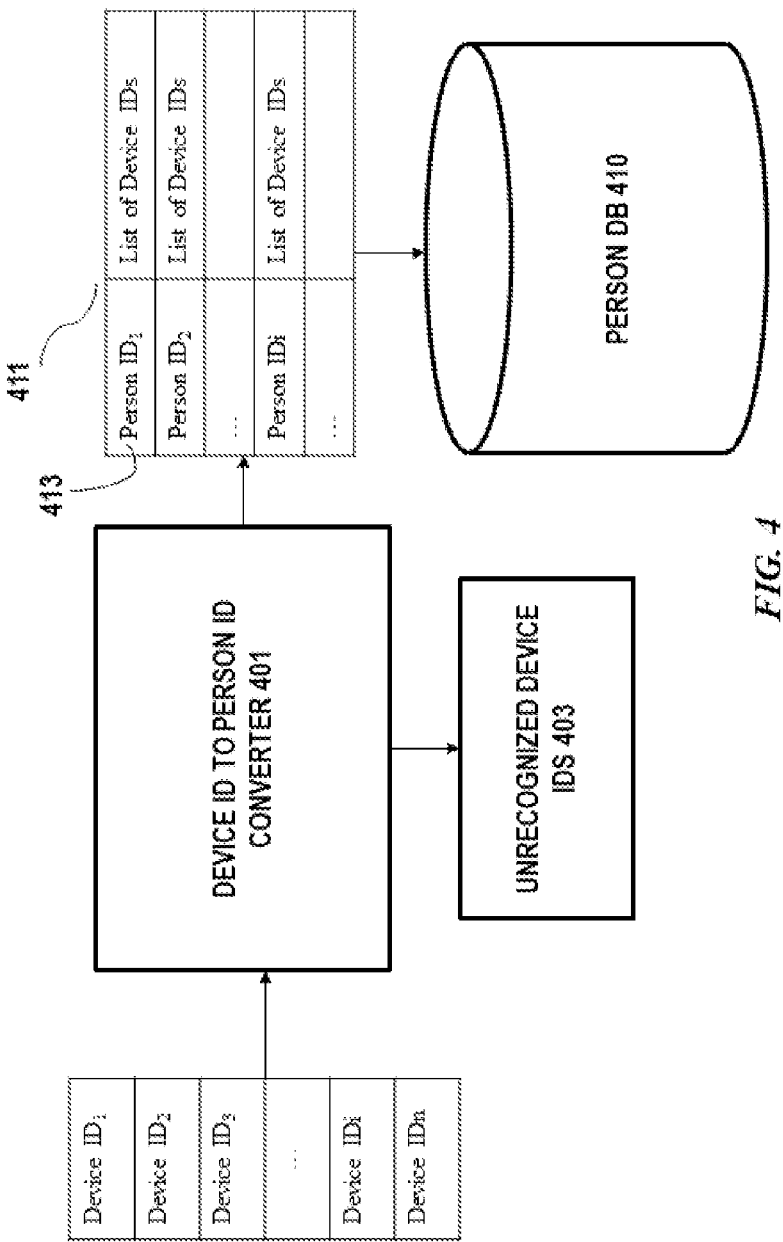
FIG. 4 schematically illustrates a device identifier (ID) to person identity (ID) converter, in accordance with some embodiments.

As described above, the original/raw location data may not be associated with a person. In some embodiments, a device ID to person ID converter of the system may be used to correlate the location data with a person based on the Device ID. FIG. 4 schematically illustrates a device ID to person ID converter 401 in accordance with some embodiments.

The device ID to person ID converter 401 may be configured to associated one or more Device IDs with a Person ID. The device ID to person ID converter 401 may process the Device ID data and correlate the Device IDs with a person identifier. A person identifier 413 may correspond to an identify of a person which can be obtained using suitable identity resolution method. The identity resolution method may cover different identity attributes and matching algorithms. For instance, identity related data such as personal identity attributes, social behavior attributes, and social relationship attributes may be processed by matching algorithms such as pair-wise comparison, transitive closure, and collective clustering to extract a person identity. The identity related data and the Device IDs may be further processed and correlated to form person data records 411. An entry 413 of a person data record may comprise multiple data fields such as Person ID and Device ID. The person data records 411 may then be stored in the person database 410. In some cases, unrecognized Device IDs 403 may be stored in a separate database.

Figure 5:
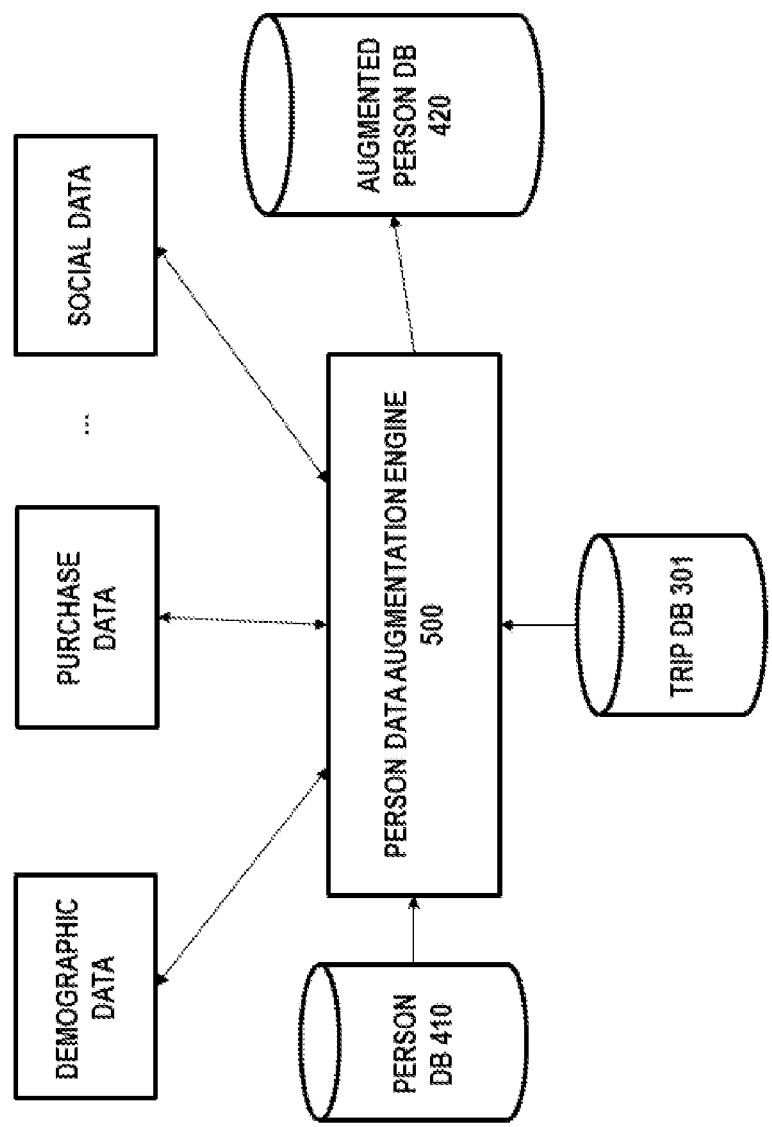
FIG. 5 schematically illustrates a person data augmentation engine configured to augment person data records in a person database, in accordance with some embodiments.

In some embodiments, a person data record may be augmented with additional personal data. FIG. 5 schematically illustrates a person data augmentation engine 500 configured to augment person data records to form an augmented person database 420. In some embodiments, the person data augmentation engine may retrieve user data (e.g., demographic data, purchase data, social graph, etc.) from a plurality of data sources and trip data from the Trip database 301 to augment the person data records.

The user data may comprise personal data related to an individual such as identity, age, gender, contact information, demographic data and others. Such data may be extracted from other data sources or third party applications. In some cases, personal data may also include user preferences. User preferences may include both travel preference and transactional/service preferences. The travel preference may be derived from one or more of various parameters acquired by the system, and used to generate a personalized travel route or to predict a transportation mode. For example, a travel preference such as a "fastest route" preference indicates a preference for the fastest (temporally) route between two points. A "shortest route" preference can indicate a preference for the shortest (distance) route between two points. A "most fuel-efficient route" preference can indicate a preference for fuel savings. A travel preference may indicate a preference for "effort" that may be especially relevant to cyclists, walkers, runners, hikers, and swimmers that may want, for example, large changes in grade (e.g., hills) or small changes in grade (e.g., flat). A travel preference may indicate a preference for a route with various scenic points, more vegetation than urban vistas, and the like, a preference for museums, theaters, playhouses, and the like, a preference for routes that include shopping opportunities, a preference for food, a preference by a user to avoid being stuck in traffic, even if the traffic-heavy route is the fastest path to their destination and various other preferences. A travel preference may include user-preferred transportation mode (e.g., autonomous vehicle, public transportation (such as train, light rail, or city bus), shuttle, ride-sharing, ride-hailing, shared trip or private trip, walking, bicycle, e-scooter, taxi, etc.), or user experience inside a vehicle (e.g., access to music, game) and the like. The travel preferences may be used to determine the travel route, segments of a route, transportation mode for a segment, and/or stops (e.g., scenic views, restaurants, coffee shops, etc.) during the travel route. Such user preferences may be inputted by the user and/or extracted from other data sources or historical data.

The purchase data may comprise any purchase or transaction historical of a user made during a trip or at the end of a trip. The purchase or transaction may be performed in any locations that may not be in-vehicle (e.g., at the destination). The purchase or transaction may be in-vehicle or in-cabin transactions.

In some cases, a social data may depict relationships between various users or vehicles to facilitate in-car sharing, among other things. In some cases, social data may indicate the relationship between the user and other individuals and entities (e.g., family, business, friend, etc.), a road network, and potential meeting-spots within a community. In some cases, the social data may be used for facilitating car sharing, offering recommended vehicles and locations, suggesting car sharing partners based on shared interests and mobility activities. In some cases, the social data may be used to predict or recommend a location and/or schedule for the trip. For example, if the user is scheduled to meet someone in a business relationship with the user, the arrival time may be scheduled based on a business meeting preference. The social data may be obtained from social networks (e.g., Facebook, Twitter, LinkedIn, etc.), historical communications (e.g., email, SMS, video chat, etc.), common membership in clubs, common membership in organizations, common membership and societies, family relationships, common employer, common workplace, and the like.

In some cases, the additional user data may be used to predict a transportation mode for at least a segment of a trip. For instance, the user data may include a transportation mode (e.g., autonomous vehicle, public transportation (such as train, light rail, or city bus), shuttle, ride-sharing, ride-hailing, shared trip or private trip, walking, bicycle, e-scooter, taxi, etc.) collected from the historical transportation data associated with a user.

The person data augmentation engine 500 may be configured to augment person data records in a person database 410 with user data (e.g., demographic data, purchase data, social graph, etc.) and trip data retrieved from the trip database 301 thereby generating an augmented person data records. In some embodiments, trip data and the person data may be consolidated based on the Device ID. In some embodiments, the person data augmentation engine 500 may adopt suitable techniques to consolidate disparate databases (i.e., trip database, person database). For instance, the trip database may be consolidated with the plurality of records in the person database by incorporating the trip data into one of the plurality of person data records based on a matched Device ID. The consolidated person data record may then be saved in an augmented person database 420 as augmented person data records. For example, an augmented person data record may comprise data fields such as person ID, device ID, and the corresponding trip data (e.g., series of location data tagged with POIs).

Figure 6:
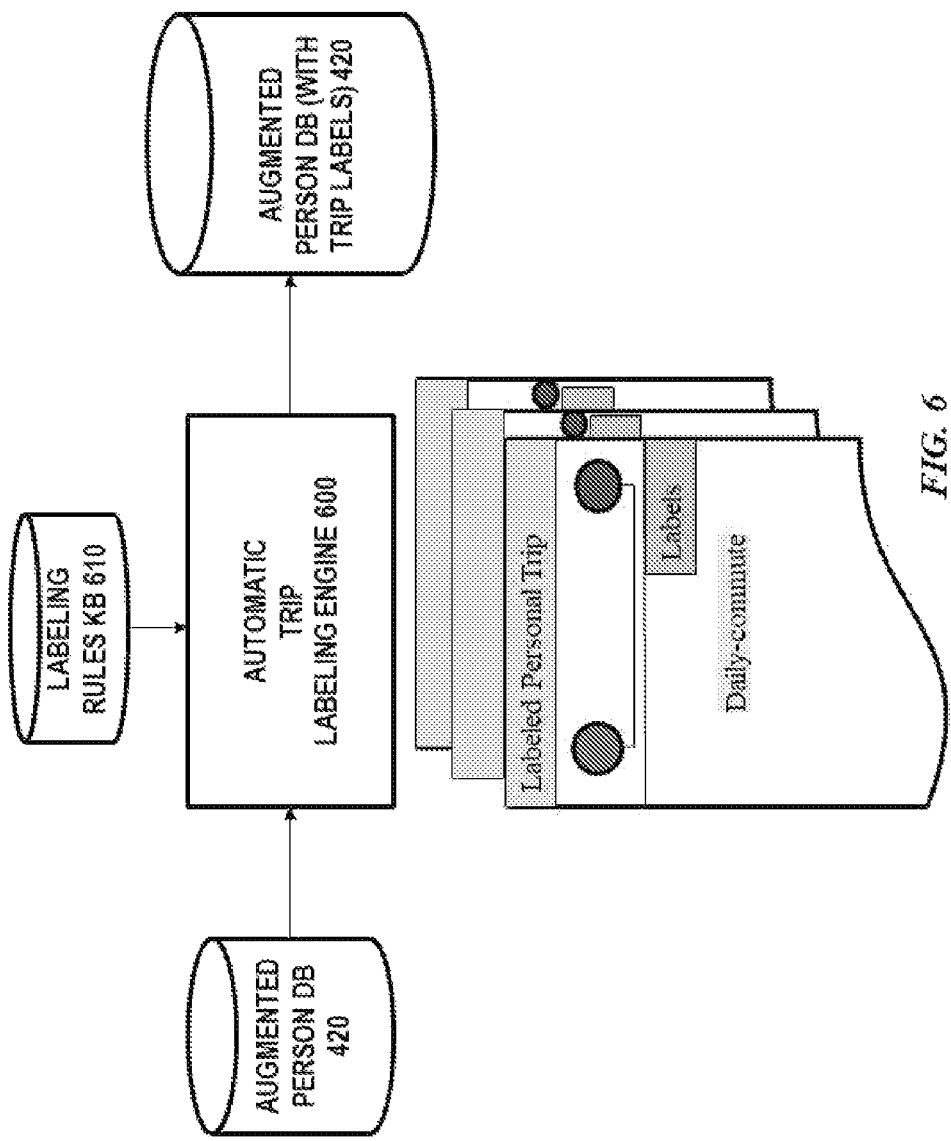
FIG. 6 schematically illustrates an automatic trip labeling engine configured to further augment the data stored in the augmented person database with intent or destination related labels, in accordance with some embodiments.

In some embodiments, the augmented person data records may be further updated and augmented with additional intent or destination related information. FIG. 6 schematically illustrates an automatic trip labeling engine 600 configured to further augment the data stored in the augmented person database 420 with intent or destination related labels.

In some embodiments, the intent of a destination may be contextual information related to an activity, or an intent inferred from a destination. For instance, an intent of a supermarket may be food shopping, an intent associated with a trip in the morning of a weekday may be daily-commute, an intent associated with food, gas and the like may be shopping, and an intent associated with sports arena, movie theater may be entertainment. Such intents may be obtained from a labeling rules knowledge base 610 that stores a list of intent labels. The automatic trip labeling engine 600 may label the destination of each trip with an intent label provided by the labeling rules knowledge base 610. The augmented person data record may then be updated by incorporating the intent of the destination associated with each trip.

Figure 7:
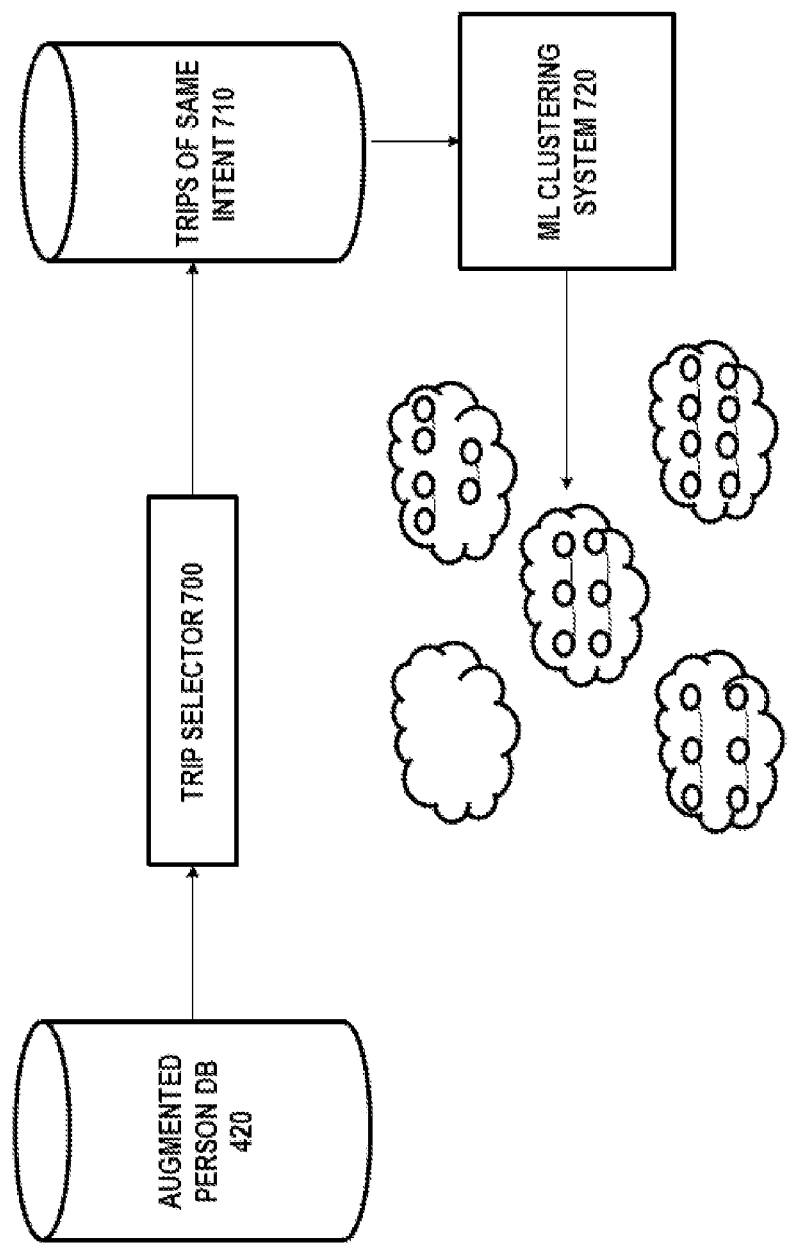
FIG. 7 schematically illustrates a trip selector configured to group the plurality trips by the trip intent, in accordance with some embodiments.

In some embodiments, the augmented person data records may be processed by a trip selector of the system for grouping the trips by the intent. The groups of trips may be further processed by a machine learning based clustering system to be further clustered by the destination. FIG. 7 schematically illustrates a trip selector 700 configured to group the plurality trips retrieved from the augmented person database 420 based on the intent. For instance, trips having the same intent labels may be grouped together. The trips having the same intent (e.g., communicate to work) may or may not have the same destinations.

In some cases, the trips grouped by intent are further processed by the machine learning-based clustering system. The machine learning-based clustering system may perform clustering analysis on the trips to determine natural groupings of the trips for the set of intents. For instance, trips of the same cluster may have the same destination and may have different origins, intermediate stops, or start/end time. In some cases, a set of trips belong to the same cluster may have one or more characteristics (e.g., origin, transportation mode, an intermediate stop) in common in addition to intent. In some cases, the one or more common characteristics may be identified and used as a label for a trip or a segment of a trip.

In some cases, a label associated with a cluster may be used as part of training dataset for training a classifier. The label may be used as part of the training dataset to pair with the trip data. The label may be created manually by one or more individuals, organizations, or imported from external systems or resources. The labels (e.g., personal car, morning trip, direct-commute-to-work, etc.) may be identified based on the natural clustering generated by the machine learning-based clustering system as described above.

Figure 8:
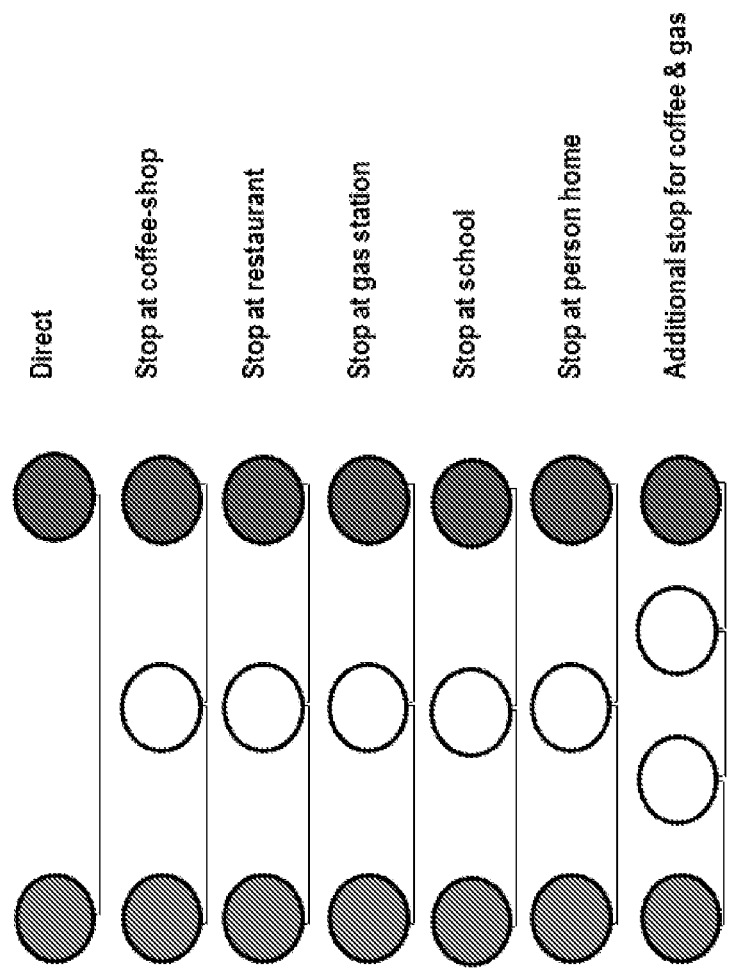
FIG. 8 shows an example of a cluster of trips, in accordance with some embodiments.

FIG. 8 shows an example of a cluster of trips. The set of trips may be contained in a "commute to work using personal car" cluster. The set of trips may have the same destination and same intent while the intermediate stops may be different.

Figure 9:
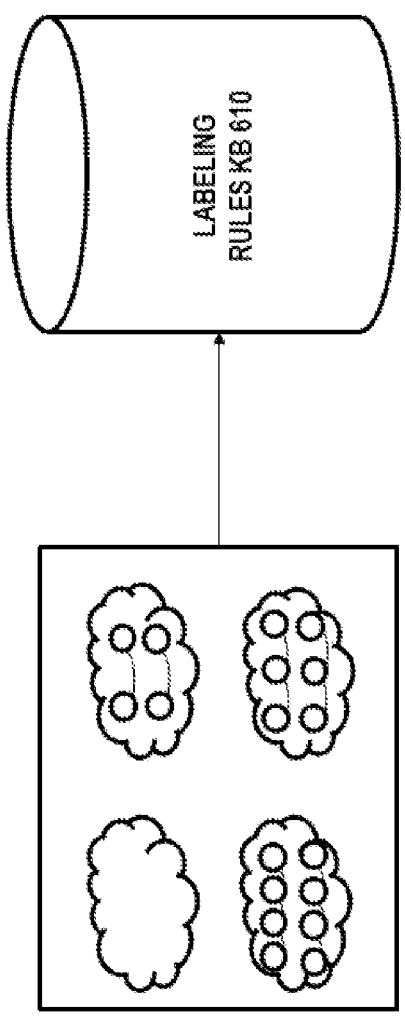
FIG. 9 illustrates the labeling rules knowledge base updated with labels created for a segment of a trip, in accordance with some embodiments.

In some embodiments, a segment of a trip may be labeled with augmented data. FIG. 9 illustrates the labeling rules knowledge base is updated with labels created for a segment of a trip. The labels may be created manually by one or more individuals, organizations, or imported from external systems or resources. The labels (e.g., personal car, morning trip, direct-commute-to-work, etc.) may be identified based on the natural clustering generated by the machine learning-based clustering system as described above.

Figure 10:
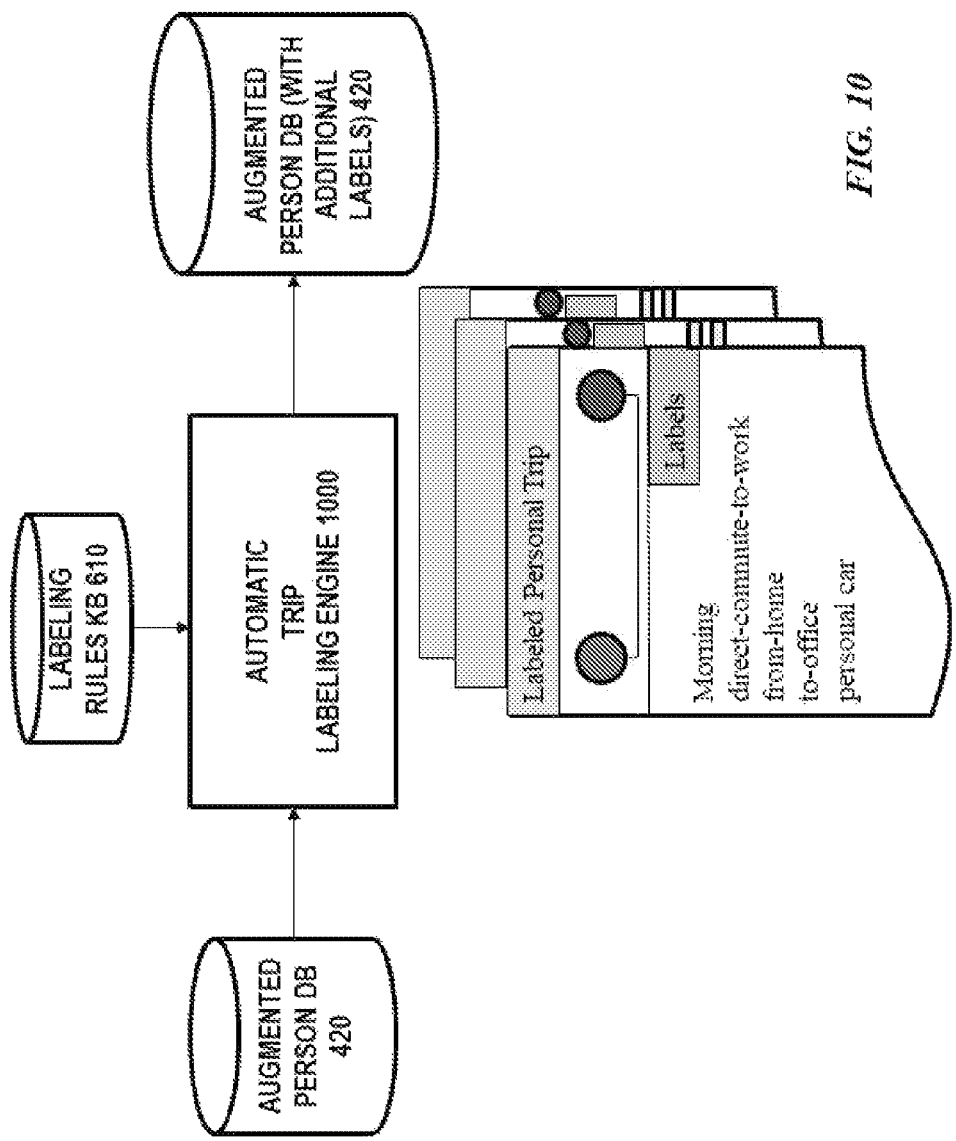
FIG. 10 schematically illustrates an automatic trip labeling engine configured to label the trips with labels obtained using clustering analysis.

In some embodiments, the labels created for a trip or a segment of the trip may be used to supplement the augmented person data records. FIG. 10 schematically illustrates an automatic trip labeling engine 1000 configured to label the trips with labels obtained using the clustering analysis as described above. The automatic trip labeling engine 1000 can be the same as the automatic trip labeling engine as described in FIG. 6. The automatic trip labeling engine 1000 may label a trip or one or more segments of the trip automatically. In some cases, the labeling may be performed based on labeling rules retrieved from the labeling rules knowledge base 610. The labeling rules may be manually developed by one or more individuals, organizations, imported from external systems or resources, or may be partially learned using machine learning systems that collaborate with users (e.g., extracting transportation terms from natural language text). Below are example rules stored in the labeling rules knowledge base 610:

Rule 1: IF a trip_start_time is after 5:00 am AND trip_end_time is before 12:00 pm THEN label="morning_trip" (in this we calculate local time zone AM, PM)

Rule 2: IF trip_type="daily-commute" AND intermediate_stop_duration is >5 mins AND<20 mins, AND in_trip_POI_type="coffee-shop" THEN label="commute-to-work-coffee-shop"

Trips augmented with the additional labels may be stored in the augmented person database. As shown in FIG. 10, the augmented person data record comprises additional labels (e.g., morning, direct-commute-to-work, from-home, to-office, personal car, etc.) compared to the augmented person data record as shown in FIG. 6.

Figure 11:
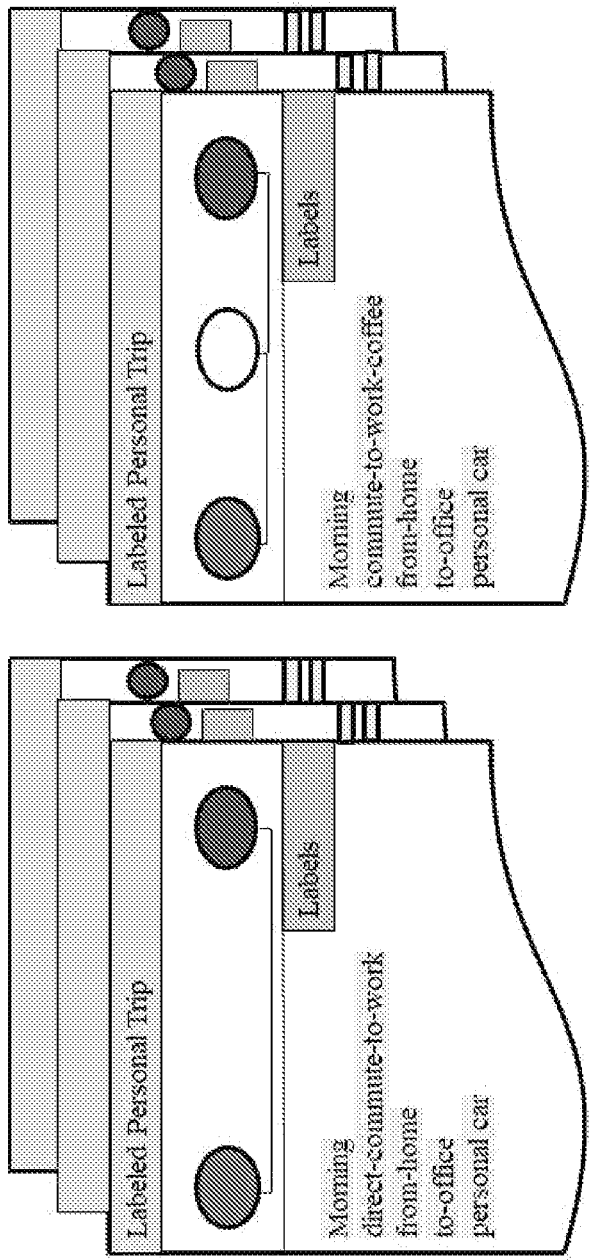
FIG. 11 shows examples of augmented person data records with different additional labels.

FIG. 11 shows examples of augmented person data records with different additional labels. The two augmented person data records as shown in the example have the same intent, a plurality of common characteristics (e.g., morning, from-home, to-office, personal car) with one character different (e.g., direct-commute-to-work, commute-to-work-coffee).

Figure 12:
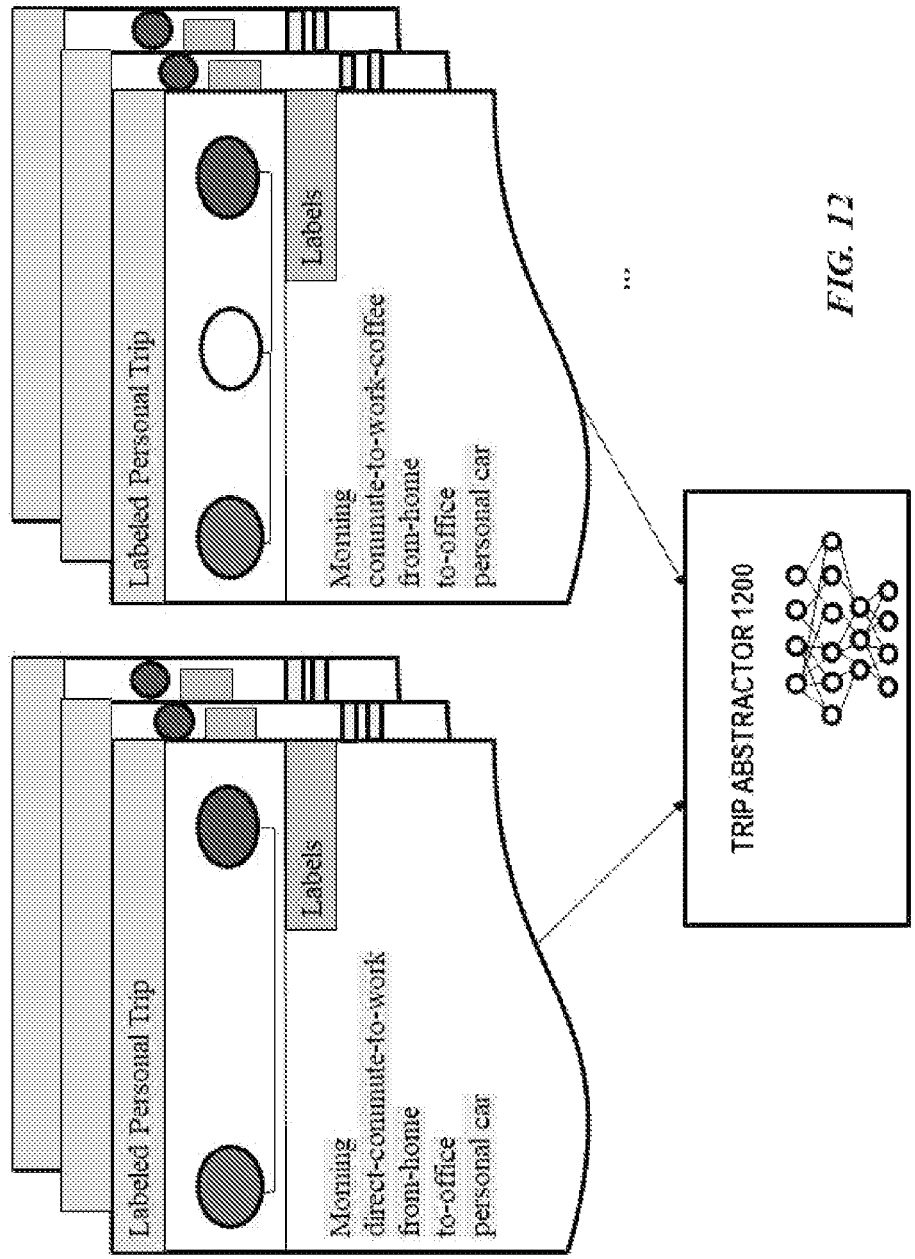
FIG. 12 schematically illustrates a trip abstractor of the system, in accordance with some embodiments.

In some embodiments, the plurality of augmented person data records may be used to train a machine-learning based trip abstractor. FIG. 12 schematically illustrates a trip abstractor 1200 of the system, in accordance with some embodiments. The trip abstractor may be a classifier trained using the of augmented person data records that includes the additional labels. Trip abstractor may process trip data and predict an intent associated with a trip destination. Artificial intelligence, such as machine learning algorithms, may be used to train the trip abstractor. A machine learning algorithm may be a neural network, for example. Examples of neural networks include a deep neural network, convolutional neural network (CNN), and recurrent neural network (RNN). In some cases, a machine learning algorithm trained model may be pre-trained and implemented on the system, and the pre-trained model may undergo continual re-training that involves continual tuning of the predictive model or a component of the predictive model (e.g., classifier) to adapt to changes in the implementation environment over time (e.g., changes in the customer/user data, available labeled data, model performance, third-party data, etc.).

Figure 13:
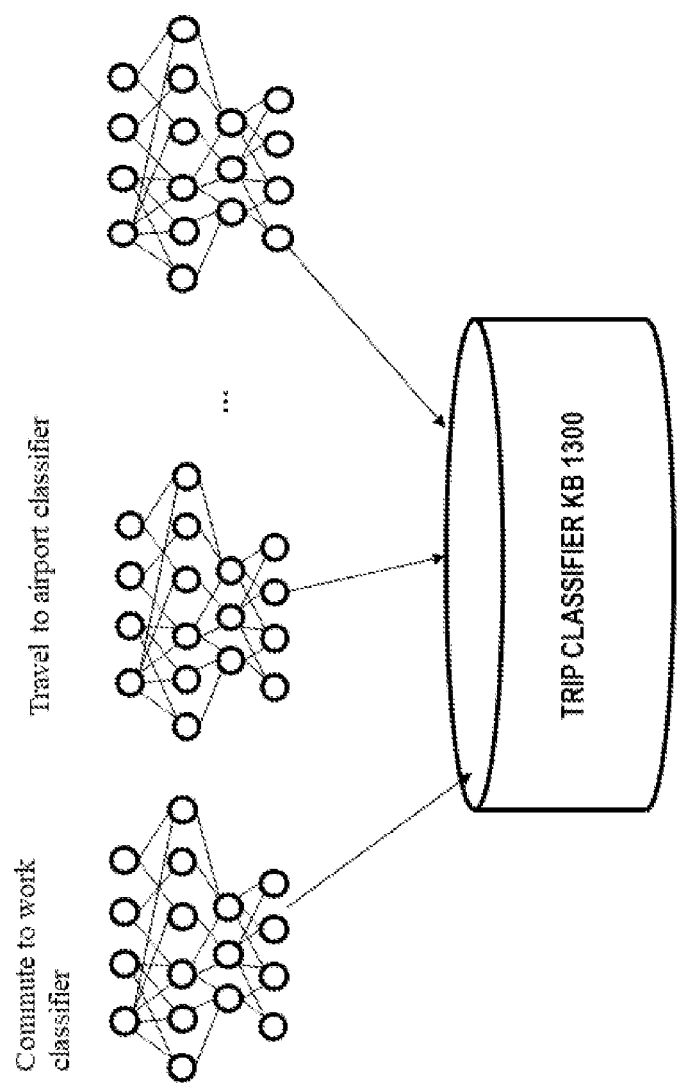
FIG. 13 schematically illustrates a plurality of trip classifiers stored in a trip classifier knowledge base.

In some embodiments, a trip classifier may correspond to an intent of a trip. FIG. 13 schematically illustrates a plurality of trip classifiers stored in a trip classifier knowledge base 1300. In some cases, training a model may involve selecting a model type (e.g., CNN, RNN, a gradient-boosted classifier or repressor, etc.), selecting an architecture of the model (e.g., number of layers, nodes, ReLU layer, etc.), setting parameters, creating training data (e.g., pairing data, generating input data vectors), and processing training data to create the model. A trained model may be tested and optimized using test data retrieved from the trip classifier knowledge base. The test result may be compared against the performance characteristics to determine whether the predictive model meet the performance requirement. If the performance is good i.e., meets the performance requirement, the model may be inserted into the trip classifier knowledge base.

Figure 21:
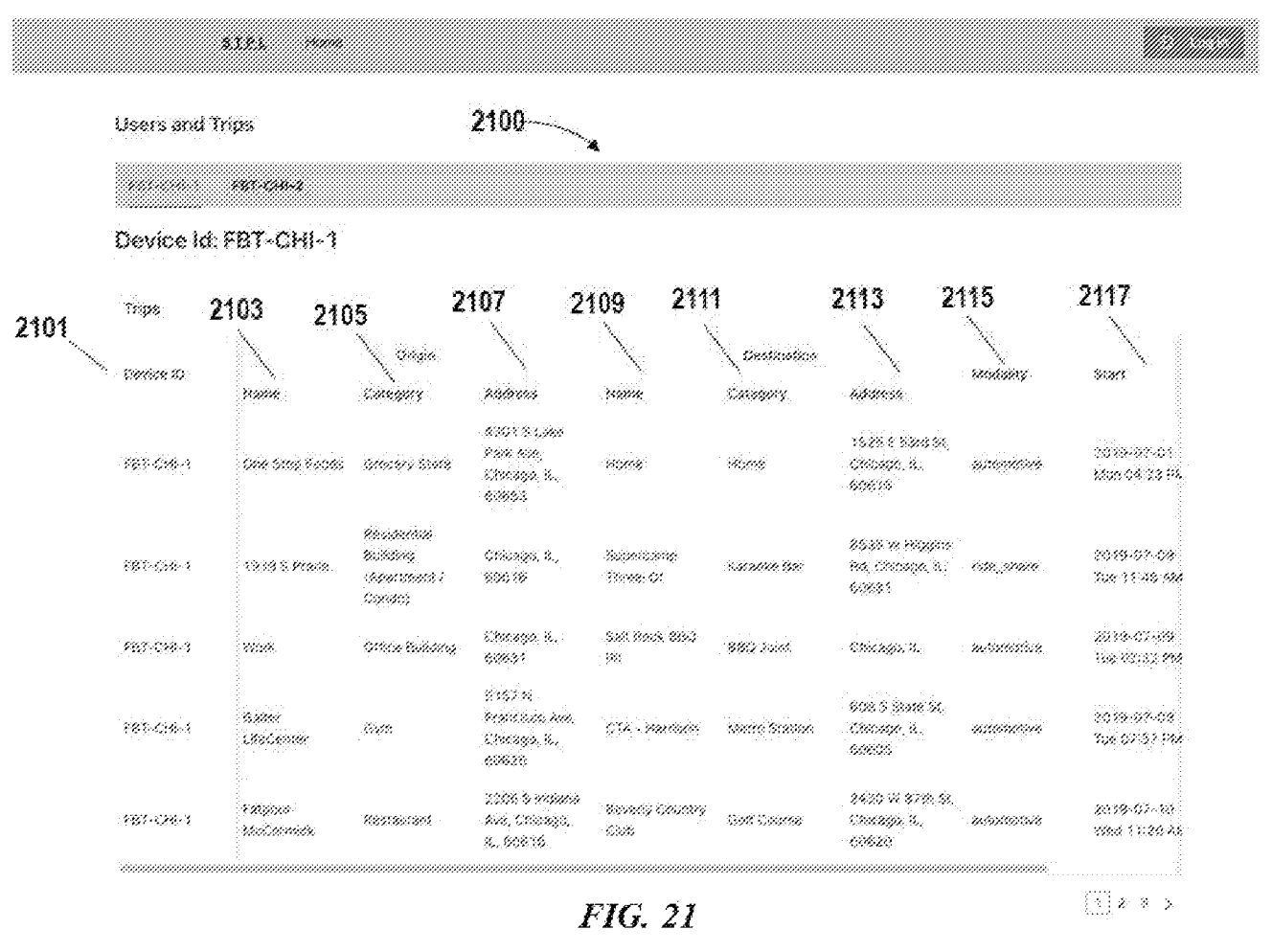

FIG. 21 shows examples of augmented trip dataset 2100 processed by the system and methods as described above. In the illustrated example, the augmented trip dataset 2100 may be generated using at least the uncorrelated GPS data. One or more augmented trips may be associated with a device such as a device ID 2101. Each augmented trip may comprise, for example, a device ID 2101, the predicted or extracted information about the origin of the trip, such as a POI/name of the origin 2103 (e.g., one stop foods, Galter LifeCenter), a category of the POI 2105 (e.g., Grocery Store, office building, guy, restaurant), an address of the origin 2107, the predicted or extracted information about the destination of the trip, such as POI of the destination 2109 (e.g., home, CTA-Harrison, etc.), a category of the predicted POI 2111 (e.g., home, metro station, etc.), address of the destination 2113, predicted modality of the trip 2115 (e.g., automotive, ride_share, etc.), start time of the trip and various information. In the illustrated example, an entry/row of the list of augmented trip data may be a trip or a segment of a trip.

Figure 14:
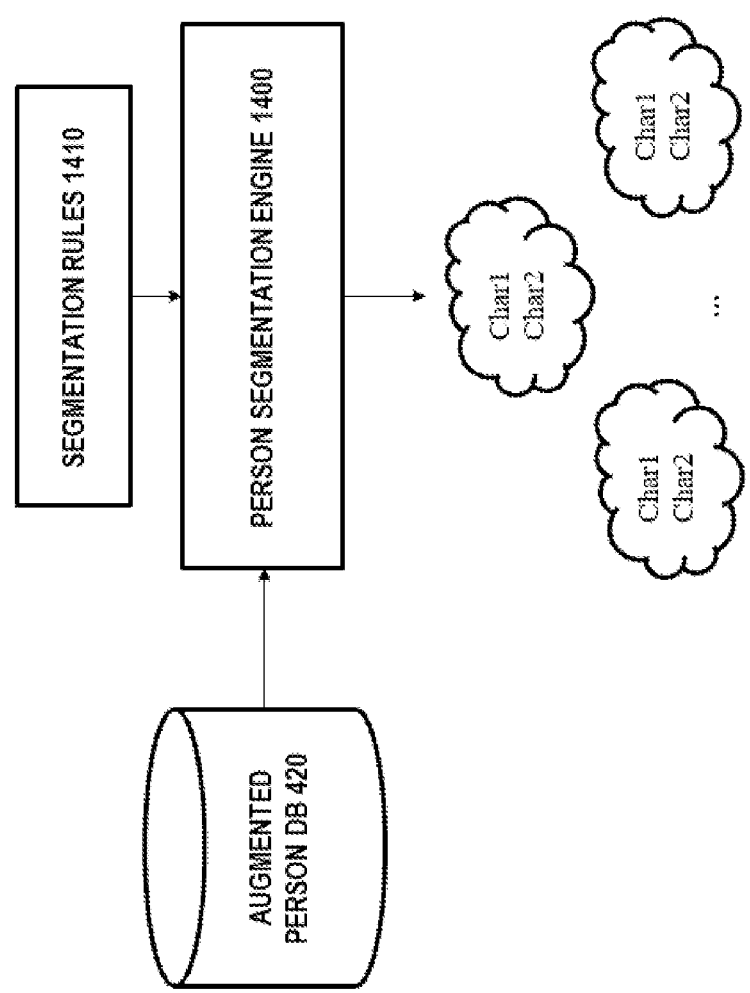
FIG. 14 schematically illustrates a person segmentation engine configured to segment the users.

In some embodiments, persons/users may be segmented and organized in segments/clusters. FIG. 14 schematically illustrates a person segmentation engine 1400 configured to segment the persons in the person database. The person segmentation may allow the system to target a certain segment of the users to make offers that may be relevant (e.g., found to be most relevant) to those users. The persons or users may be segmented (or organized into one or more segments) using any suitable segmentation technique. For example, the segmentation technique may be based on fixed segmentation rules 1410. Users may be grouped based on one or more attributes such as geography (or geolocation), social graph(s), purchase graph(s), transportation graph(s), demographic information, user preference(s), installed mobile application(s), or other user attribute(s) or characteristic(s) extracted from the user profile data, as described above. Users in the same group may share one or more user attributes or user characteristics (e.g., age, gender, geolocation, social graph, frequent flyer, frequent food shopper, etc.). An individual may belong to one or more segments. In some cases, the segments may be continuously augmented and updated automatically as new data is collected. In some embodiments, new segments may be created as new users (or classes of users) are added to or subscribed to the system. In some cases, the segments may be discrete. In other cases, two or segments may overlap, and may share a set of commonalities or characteristics.

In some cases, the segmentation technique may be based on a pattern extracted from historical data (e.g., user profile data). The pattern may be extracted using a machine learning algorithm. In some cases, a set of patterns may be initially generated and an algorithm may be employed to identify an optimal allocation of patterns to segments that is both feasible and maximize a desired outcome. The desired outcome may be offering a small number of service or transaction options relevant to the predicted destination to be sent to appropriately chosen customers (e.g., group of customers) at the appropriate time and/or location such that the chosen customers are likeliest to accept the service. The initial set of patterns may be generated using any suitable method such as a decision tree or other pattern identification algorithm. In some cases, the algorithm for identifying an optimal allocation of patterns to segments may be a trained machine learning algorithm (e.g., support vector machine or neural network).

Figure 15:
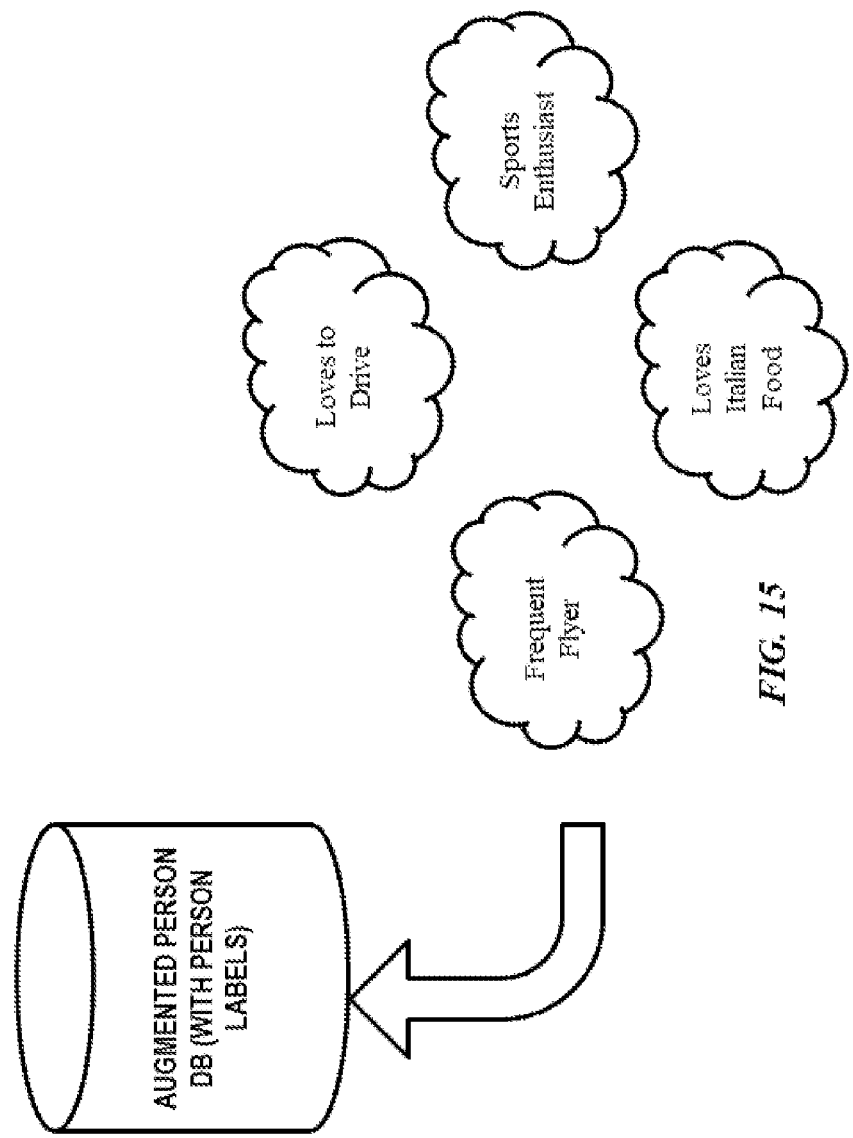
FIG. 15 shows examples of user segments labels.

In some embodiments, a label may be created for a user segment. FIG. 15 shows examples of user segments labels (e.g., loves to drive, frequent flyer, loves Italian food, sports enthusiasts, etc.). The labels may be created manually by one or more individuals, organizations, or imported from external systems or resources. Alternatively or in addition to, the labels for the user segmentation (e.g., loves to drive, frequent flyer, loves Italian food, sports enthusiasts, etc.) may be identified using machine learning approach as described above. In some cases, the labels for the user segmentation may be used to supplement the augmented person data records in the augmented person database.

Figure 16:
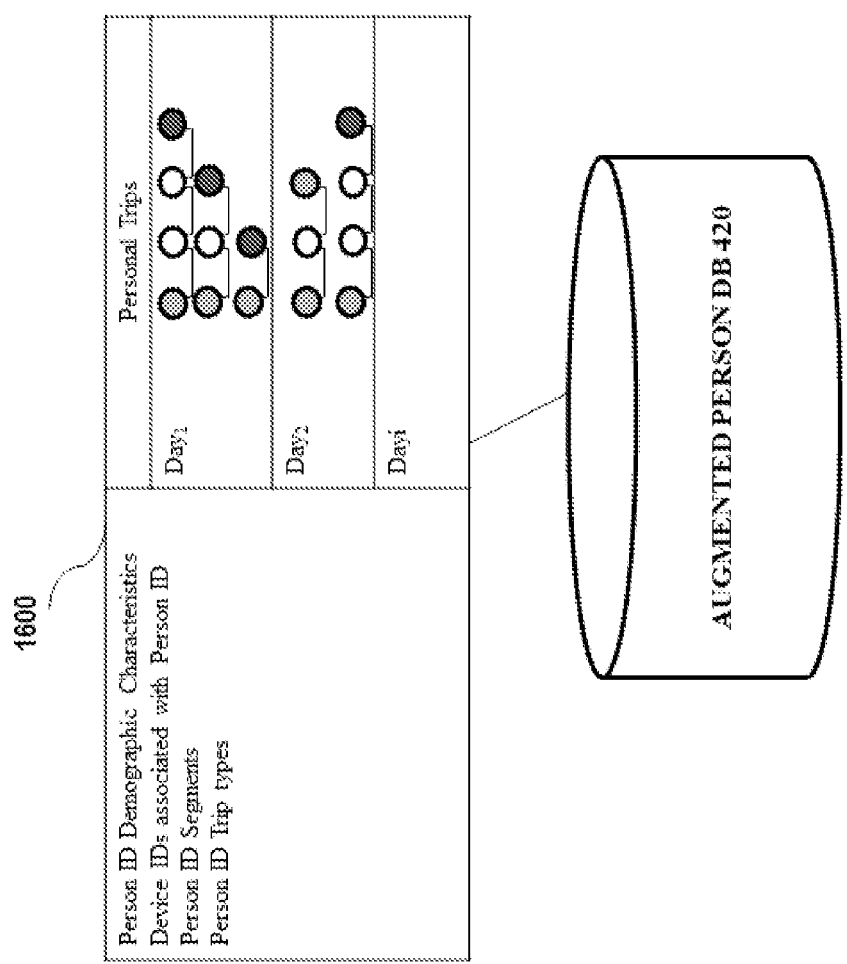
FIG. 16 shows an example of augmented person data record with all the labels and organized according to the user segmentation.

FIG. 16 shows an example augmented person data record 1600 with all the labels and organized according to the user segmentation. The augmented person data records may be managed, maintained and updated by the system periodically (e.g., hourly, daily, weekly, etc.) or upon detection of new data being added to the database. The augmented person data records may be used to form training datasets for continuously training the classifiers thereby improving performance. As described above, the training dataset may be labeled data comprising the intent or destination obtained using the clustering system.

The system may be capable of predicting an intent of a future trip without relying on user plan/schedule data (e.g., calendar, email, etc.). The system may be capable of predicting a likely destination of a current trip based on real-time or limited location data. For instance, the trained classifiers may be deployed for making predictions of an intent and/or transportation mode based on real-time location data. In some cases, the predicted intent and/or transportation mode may be generated based on location data of an origin of a trip. In some cases, the predicted intent and/or transportation mode may be generated during a trip and updated as new location data streaming in.

Figure 17:
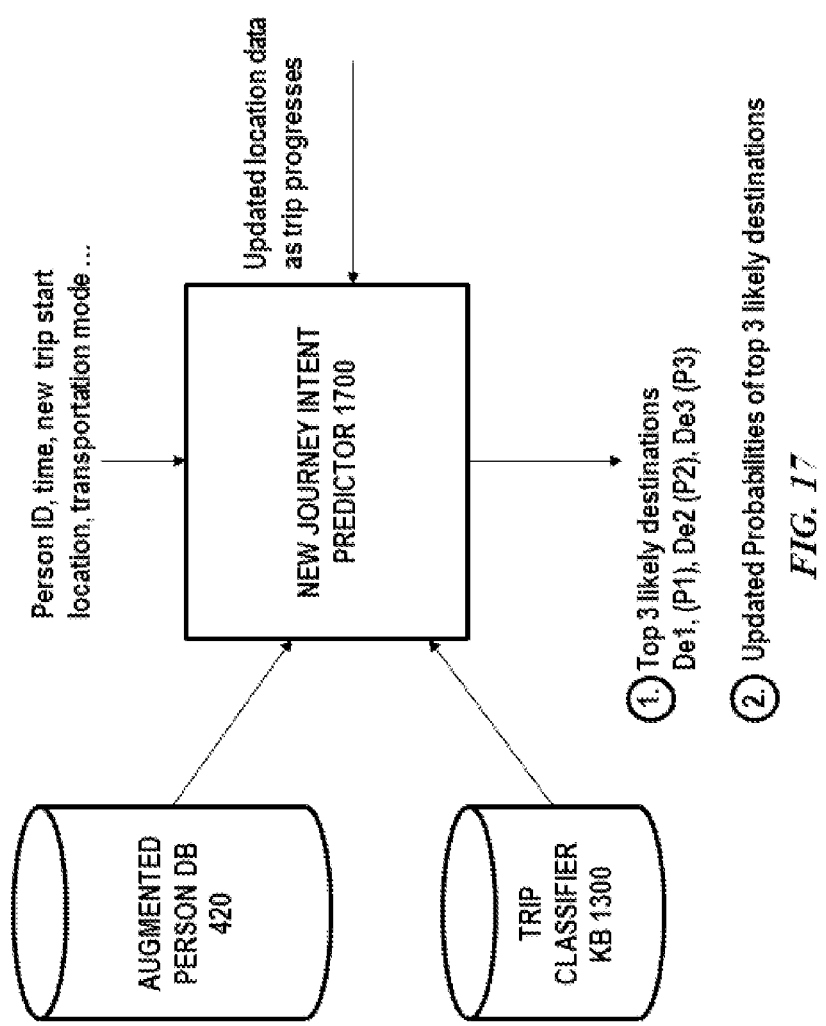
FIG. 17 schematically illustrates a new journey intent predictor of the system, in accordance with some embodiments.

FIG. 17 schematically illustrates a new journey intent predictor 1700 of the system, in accordance with some embodiments. The new journey intent predictor 1700 may make predictions of a destination and/or intent of a trip based on the real-time location data using one or more trained classifiers downloaded from the trip classifier knowledge base 1300. The new journey intent predictor 1700 may be coupled to the augmented person database 420 and the trip classifier knowledge base 1300 to download a suitable classifier and retrieve corresponding augmented person data records to form input dataset along with the real-time location data. In some cases, upon receiving real-time data such as person ID, trip start location (e.g., origin GPS location), updated location data as the trip progresses, or transportation mode, the new journey intent predictor 1700 may retrieve the corresponding augmented person data records from the augmented person database 420, extract data such as customer segment, trip type to supplement the real-time data thereby forming an input dataset to be processed by the classifier downloaded from the trip classifier knowledge base 1300.

Figure 18:
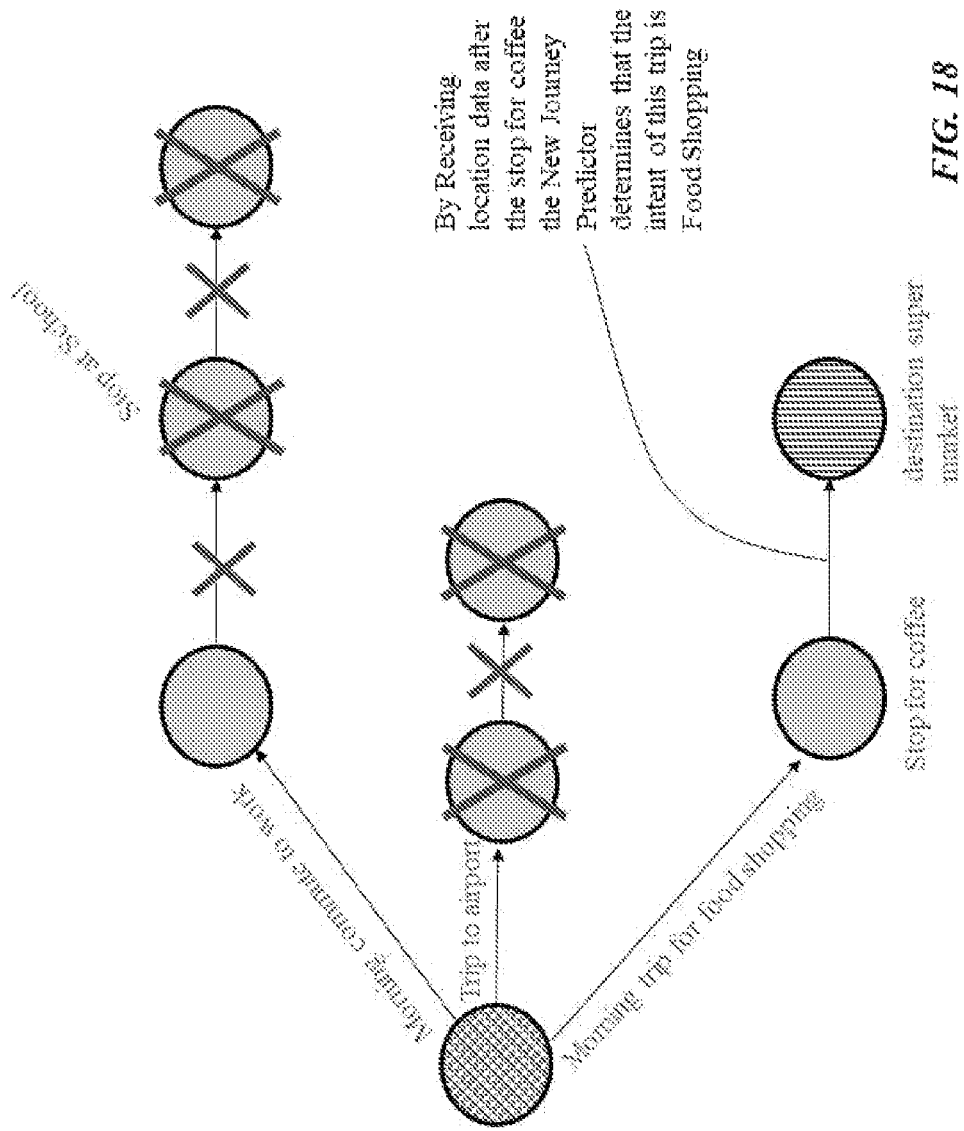
FIG. 18 shows an example process of continuously generating and updating prediction of the trip destination or intent as new data collected during a trip.

FIG. 18 shows an example process of continuously generating and updating prediction of the trip destination or intent as new data collected during a trip. As illustrated in the example, the new journey intent predictor may initially generate three predicted intents, e.g., morning trip to work, trip to airport, morning trip for food shopping, upon receiving an origin location data (e.g., trip start location). In some cases, as new location data are collected during the trip, the predicted intent may be refined and updated. For instance, as the trip progresses and the location data indicating a stop at a coffee shop is collected, the predicted intent is updated as food shopping and the predicted destination is super market.

In some embodiments, the provided system may employ an edge intelligence paradigm that at least a portion of data processing can be performed at the edge. For instance, the data processing and inference may be performed by the new journey intent predictor deployed on the user device. In some instances, machine learning models or classifiers may be built and trained on the cloud, stored and maintained in the trip classifier knowledge base 1300 and run on the edge device or edge system (e.g., hardware accelerator). Systems and methods of the disclosure may provide an efficient and highly scalable intent prediction platform that enables real-time, on-site trip destination and intent prediction.

The predicted intent or trip destination may be used in various applications. For instance, the predicted intent or destination may be used for providing transaction offers, service for facilitating the travel, providing offers relevant to the predicted destination and various others. For example, the predicted intent or destination may be used to facilitate users travel to the intended destination by providing information about the fast route, parking, or available transportation modality. In another example, the predicted intent or destination may be used to provide offers that are relevant to the destination such as discounts on items offered by a predicted destination (e.g., supermarket) or a service nearby the destination (e.g., a coffee shop at the supermarket). In a further example, the predicted intent or destination may be used to influence the user's original intent to divert the user from the predicted destination (e.g., providing discount, services offered by a competing service provider).

Figure 19:
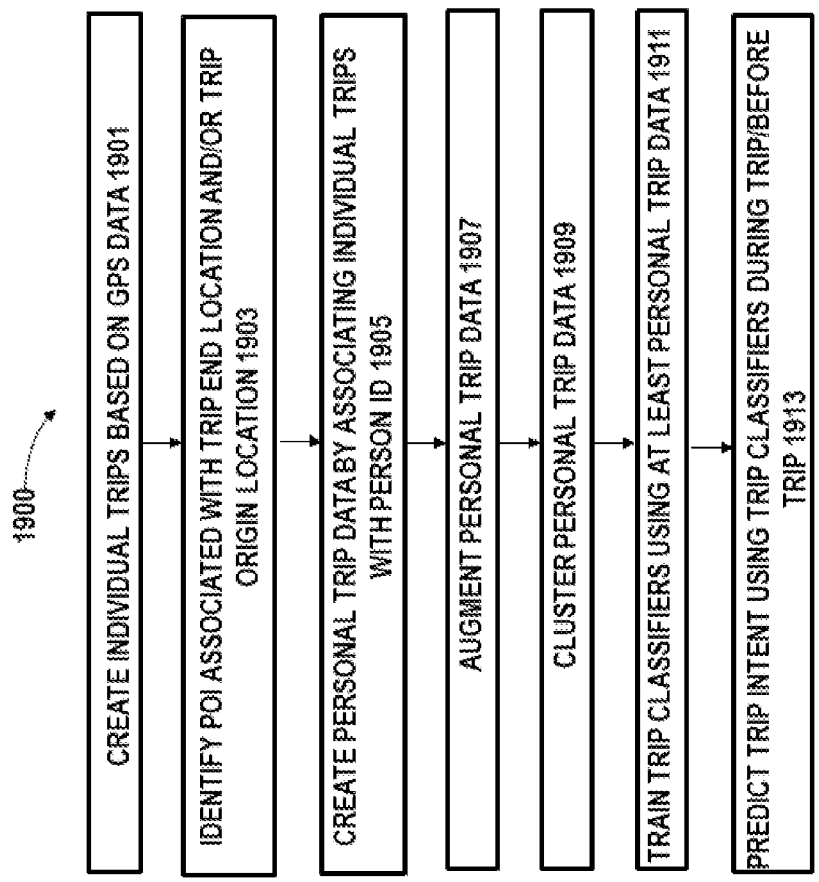
FIG. 19 shows an example process of predicting a trip intent for a user.

FIG. 19 shows an example process 1900 of predicting a trip intent for a user. In the illustrated example, location data such as GPS data may be obtained and analyzed for creating a plurality of individual trips (operation 1901). The real-time location data may be obtained from the user device (e.g., sensors on the user device), or user applications such as mapping and navigation applications operating on the user device. POI may be identified and assigned to the trip end location and/or trip start location (operation 1903). Person trip data may be created by associating one or more individual trips with a person ID (operation 1905). The person trip data may be augmented with additional user data (operation 1907). The augmented person trip data are clustered for identifying a trip intent (operation 1909). One or more trip classifiers are trained using the augmented person trip data (operation 1911). The trip classifiers may be executed and a trip intent, destination or transportation mode may be predicted before a new trip, at the beginning of a trip or during a trip (operation 1913). In some cases, one or more offers/services relevant to the predicted intent/destination may be displayed to the user on a user interface.

Although FIG. 19 shows a method in accordance with some embodiments, a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. In some cases, the timing for providing one or more commerce options may be based on a current geolocation of the user and/or travel time. The method may also be modified in accordance with other aspects of the disclosure as provided herein.

Figure 22:
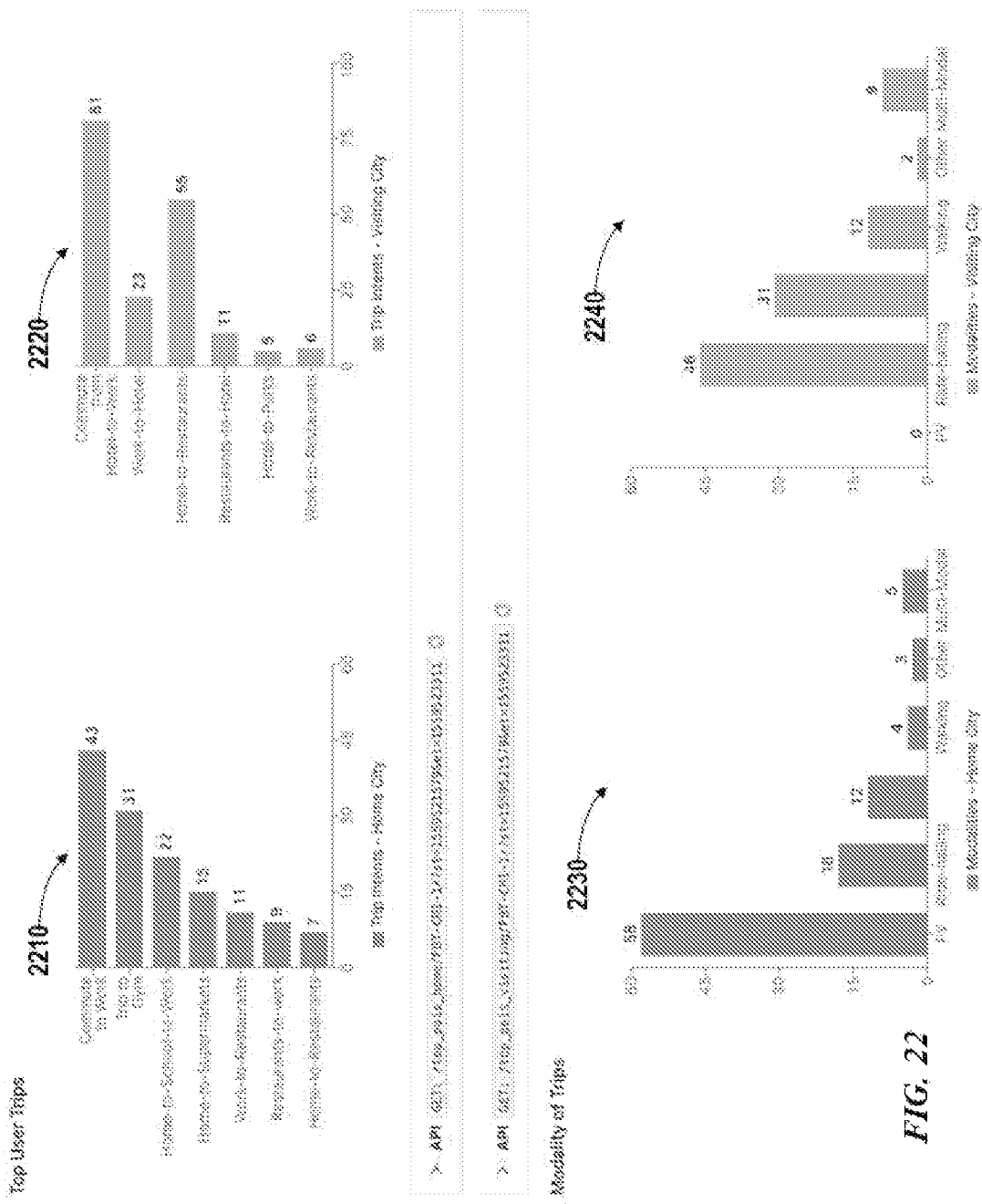
FIG. 22 shows examples of insight data extracted from trips associated with a user.

An individual's trip data may be analyzed to extract various insight information. Such insight information may be extracted based at least in part on the predicted intent of each trip associated with the individual. FIG. 22 shows examples of insight data extracted from trips associated with a user. For example, a plurality of predicted trip intents associated with an individual may be analyzed based on the city or locations the trips occurred. For example, trips of an individual that occurred in the home city may be analyzed and a diagram 2210 may be generated illustrating the number of trips organized by the trip intents. Similarly, a diagram 2220 may be provided to show the number of trips in a visiting city organized by trip intents. Such diagrams may beneficially provide insight about an individual's travel pattern in different cities. In some embodiments, a plot showing the modalities of the trips associated with an individual may also be generated. For example, a plot 2230 may show the number of trips using different modalities (e.g., private vehicle, car rental, ride-hailing, walking, multi-modal, etc.) in a home city and another plot 2240 may show the number of trips using different modalities in a visiting city. This insight may beneficially provide measurement of the mobility as a service effort of a town, city, state, country or any levels. For example, such measurements can be used by automakers, vehicle insurance companies, city, county, state and country governments, retailers (e.g., supermarkets, home improvement retailers, department stores etc.), hospitality services companies (e.g., hotels, restaurants, coffee shop chains), and/or mobility services companies/organizations to understand how well mobility and other types of transportation-related services are received by consumers.

Figure 23:
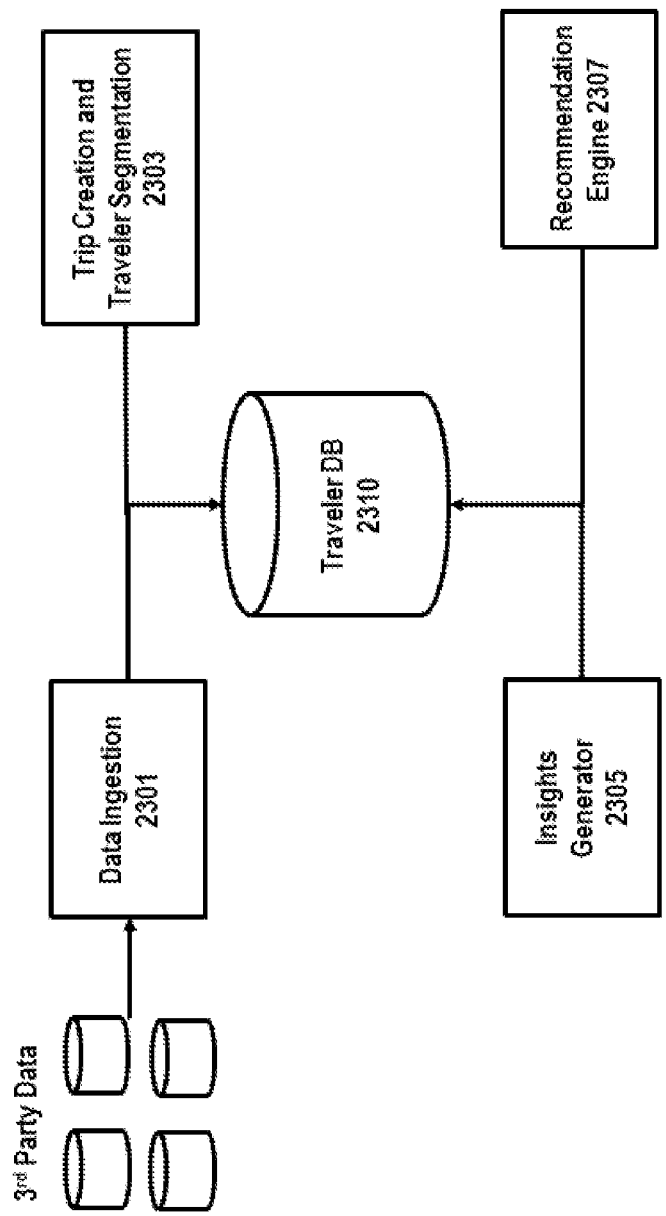
FIG. 23 shows an example of a system including an insights generator and a recommendation engine.

In some embodiments, the person database may be further augmented with predicted insights about an individual (e.g., travel preference) and/or recommendations predicted based on the insights. FIG. 23 shows an example of a system including an insights generator 2305 and a recommendation engine 2307. The traveler database 2301 can be the same as the person database as described above. For example, the traveler database may store augmented person data record including user segments labels, trips, demographic characteristics, trip types and various other data that are generated by ingesting the third-party data 2301, and performing trip creation and user segmentation 2303 as described above. The augmented person data record may further include insight data generated by the insights generator 2305 and recommendation engine 2307. The insights generator 2305 and recommendation engine 2307 may comprise one or more machine learning algorithm trained models for predicting a sets of preferences of an individual and recommendations related to transportation services.

Figure 24:
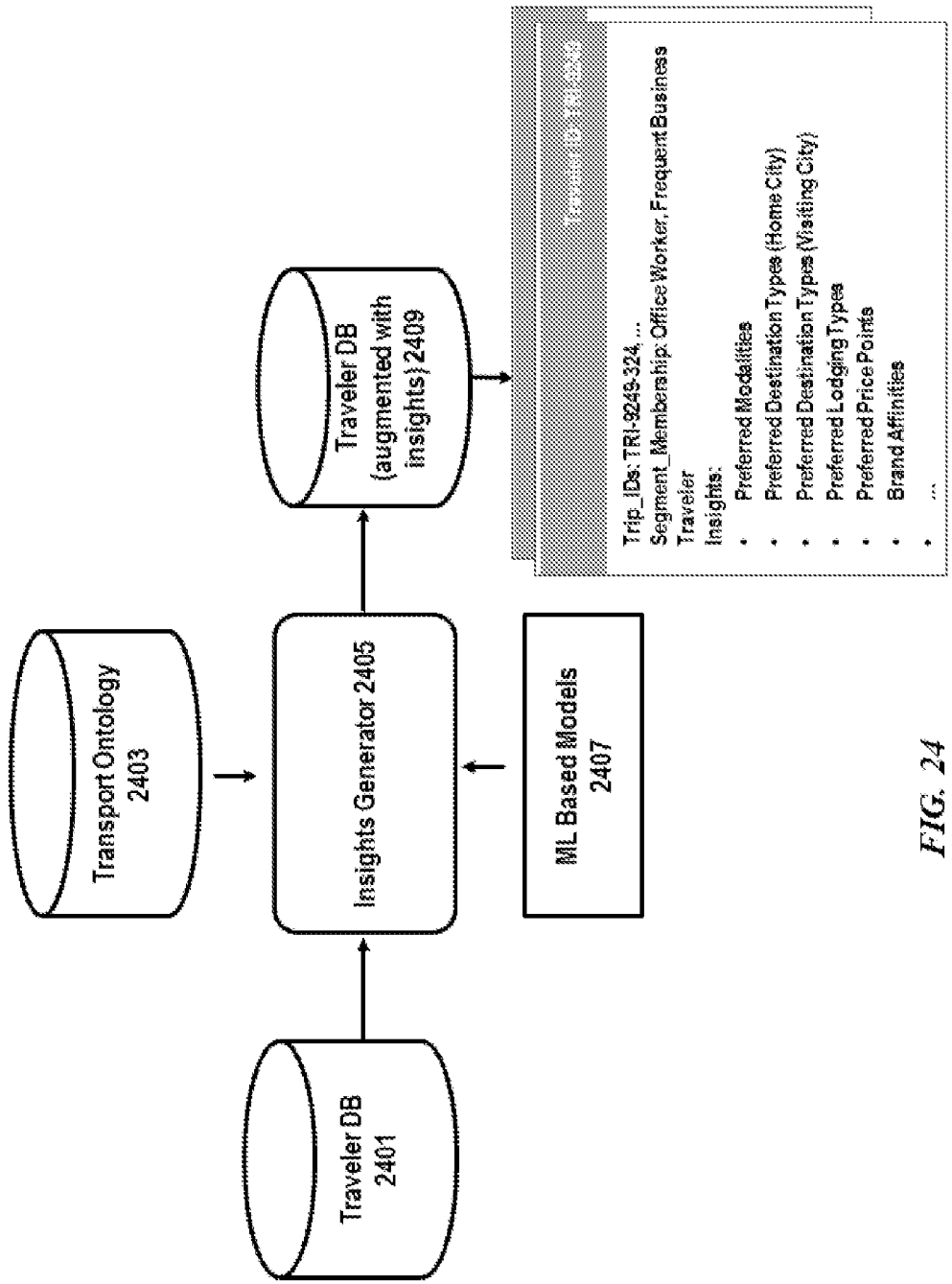
FIG. 24 schematically shows an insights generator.
Figure 25:
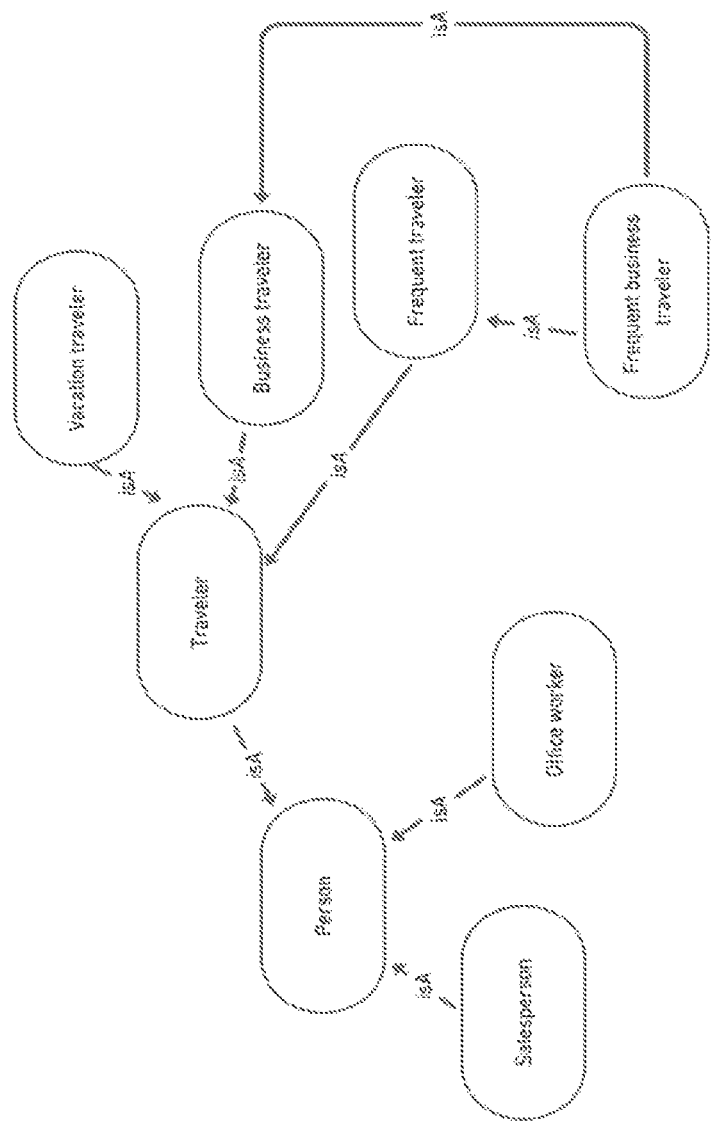
FIG. 25 shows an example of a transport ontology.

FIG. 24 schematically shows an insights generator 2405. In some cases, the insights generator 2405 may be trained to predict insights about one or more user preferences. The one or more user preferences may relate to an individual's traveling preference such as preferred modalities, preferred destination types, lodging types, or various other preferred services such as preferred restaurants, price points, brand affinities, etc. For example, the insights generator 2405 may comprise one or more machine learning-based models 2407 and a transport ontology 2403, process the person data record from the traveler database 2401 to predict the user preferences, augment the person data records with the predicted user preferences, and store the augmented person data records in the traveler database 2409. FIG. 25 shows an example of a transport ontology 2403. In some cases, the insights generator may utilize one or more machine learning-based models or machine learning techniques as described in user segmentation for predicting the segmentation labels associated with an individual. In some cases, the insights generator may make inferences based on the segmentation labels, other person data and different ontologies to generate additional insights about the user.

In some cases, the recommendation engine may be trained to generate recommendations based at least in part on the predicted preferences of an individual and a predicted intent of a trip of the individual. For example, the recommendation engine may be trained to generate recommendations (e.g., recommendations of a restaurant, a modality for the next trip segment, etc.) during a trip.

Figure 27:
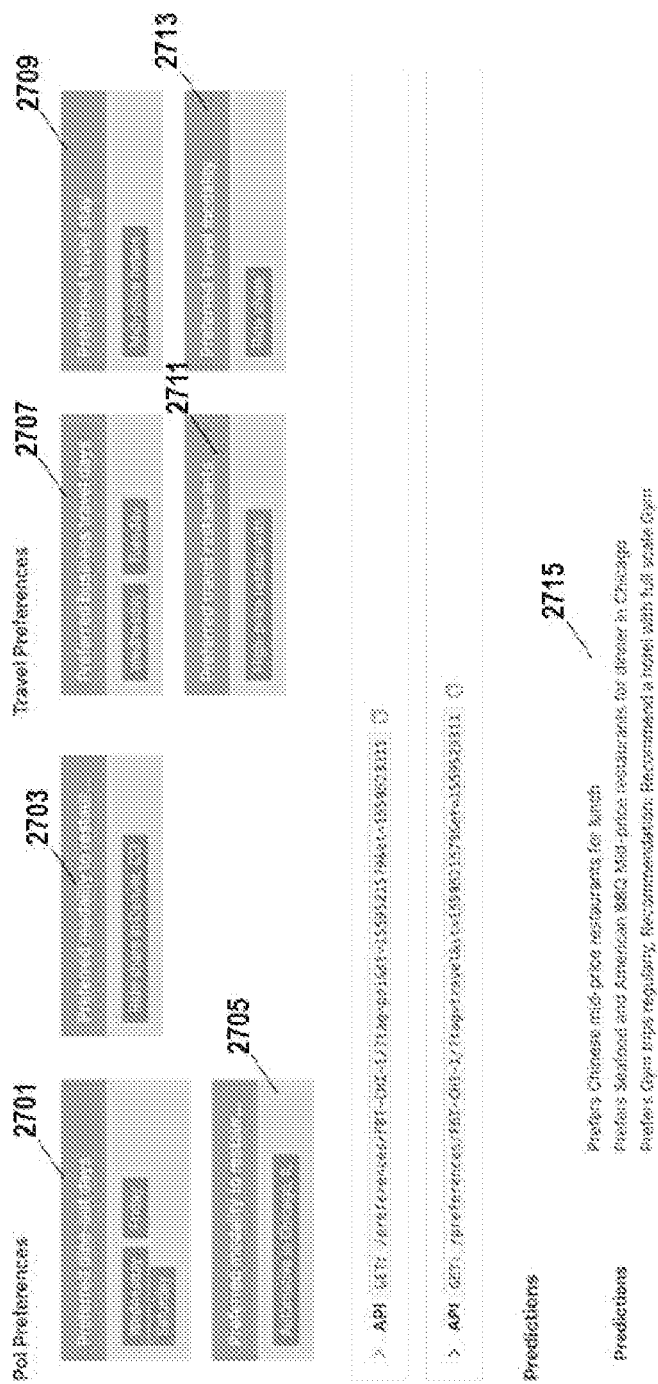

FIG. 26 and FIG. 27 show examples of insight data about an individual. The insight data may be extracted from the augmented trips 2601, 2603 associated with the individual. The insight data may be generated by the insights generator and/or the recommendation engine as described above. For example, augmented trips associated with an individual in different cities (home city 2601, visiting city 2603) may be processed to extract further insight about the individual. For instance, based on the predicted intent, modalities or other information in the augmented trip data, user preference insight such as preferred modalities 2605 (e.g., personal vehicle, ride share, walk), preferred hotel price range 2607 (e.g., mid-price), preferred cuisines 2609, persona 2611 (e.g., active lifestyles traveler, food enthusiast, health and fitness, etc.), preferred restaurant price range 2613, top brands (e.g., Peets, Target, etc.) and various other insights may be inferred. The inferred user preferences may also include POI preferences such as preferred dine-out days 2601, preferred modality to restaurant in a specific city 2703, 2705 (e.g., ride share in Denver, Automotive in Chicago), preferred business travel days 2707, preferred travel stay, preferred travel restaurants 2711, or preferred travel modality 2713. In some cases, such insight data may be utilized to make further predictions 2715 such as recommended restaurants, hotel, services to be offered in a specific city, or predicted trip.

Figure 28:
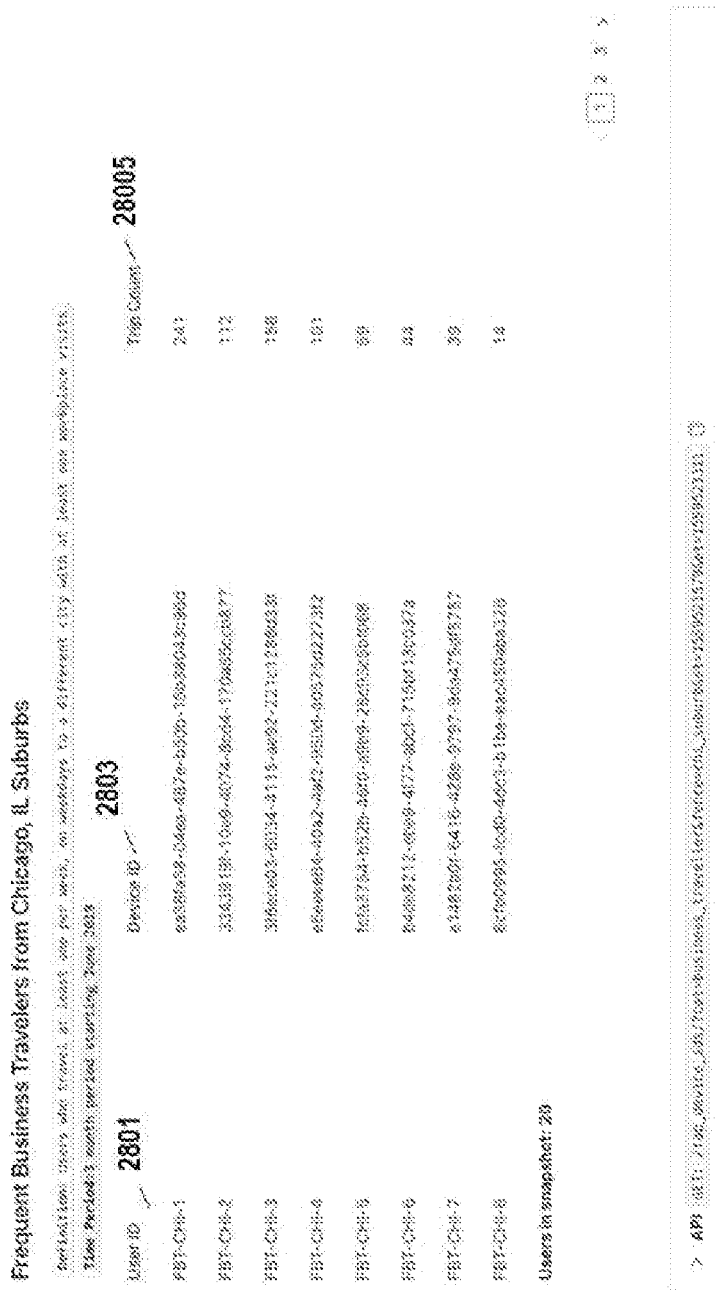
FIG. 28 shows an example of insight data about frequent business travelers from a particular geolocation.

In some cases, insight about a cohort of travelers may be provided. FIG. 28 shows an example of insight data about frequent business travelers from a particular geolocation. The insight data may include the users 2801 taking business trips from a specific location frequently, the number of trips from the specific location associated with each individual 2805, and the device ID 2803 associated with the individual. Such insight may be generated using the methods and systems as described above, such as associating uncorrelated trips with an individual and predicting intents of the trips.

Figure 29:
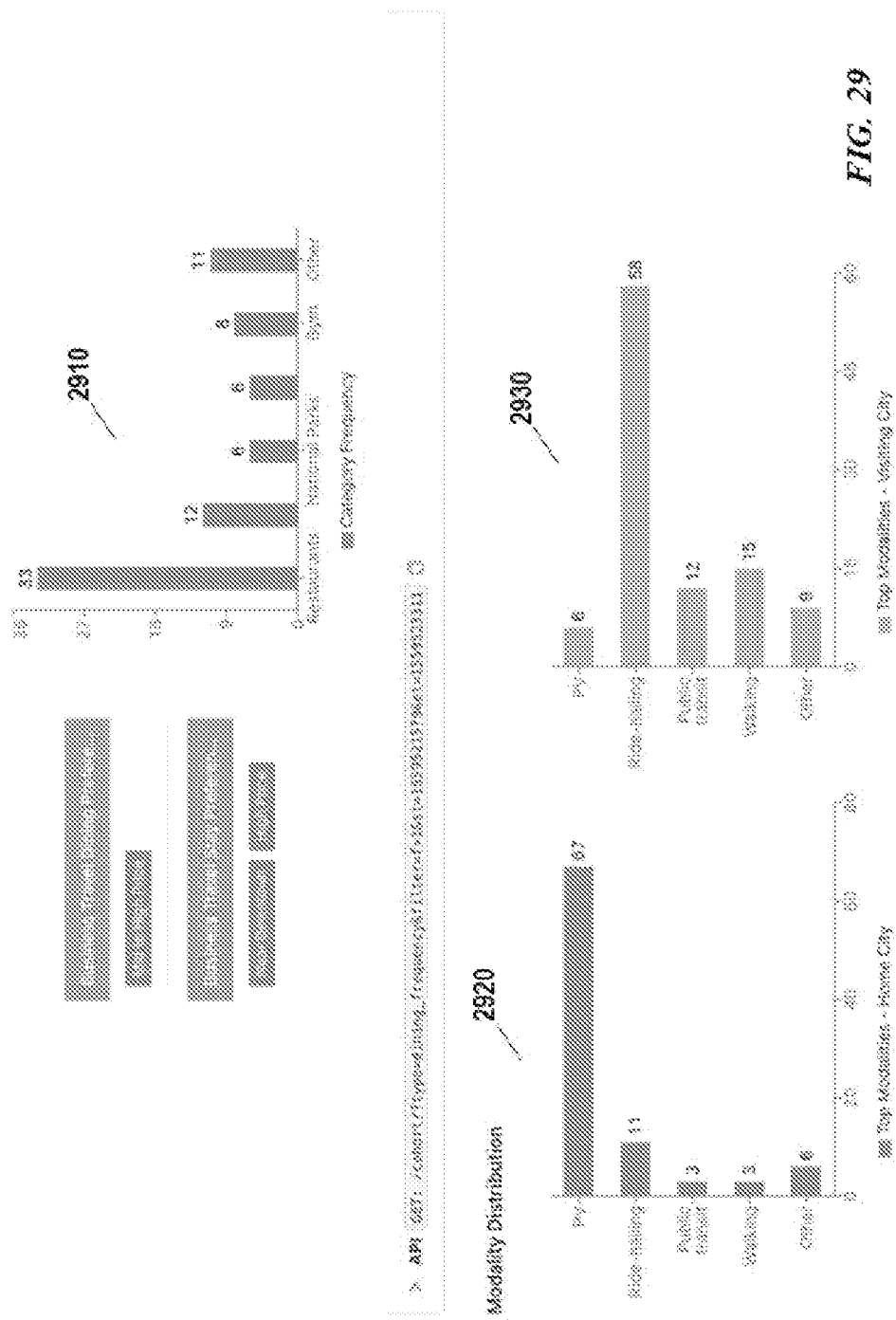
FIG. 29 shows examples of inferences or insight about a cohort or users.

The provided methods and systems may also be utilized to make inferences about trips associated with a cohort of users. FIG. 29 shows examples of inferences or insight about a cohort or users. For example, a diagram 2601 showing the category frequency of trips (e.g., restaurants, national parks, gym) associated with a cohort of users (e.g., travelers in a specific city) may be generated. In some cases, a distribution diagram about modalities of trips associated with a cohort of users such as in a home city 2920 or visiting city 2930 may be generated.

Computer Systems

Figure 20:
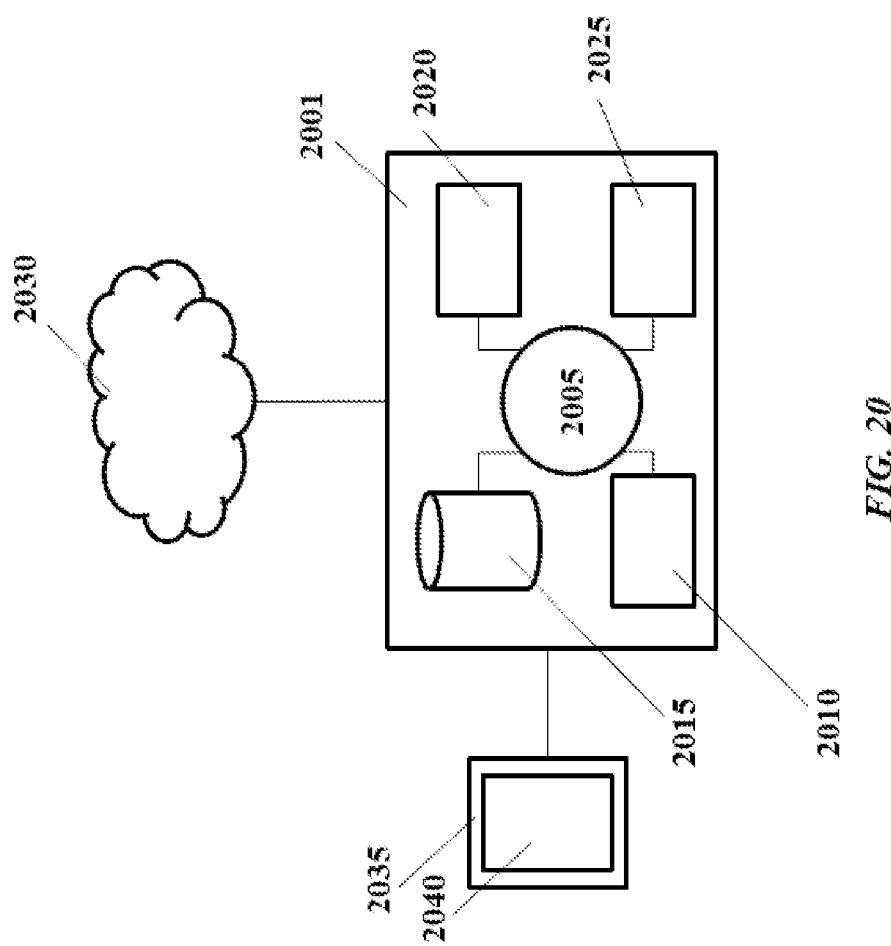
FIG. 20 shows a computer system that is programmed or otherwise configured to implement the ground mobility analysis and destination/intent prediction system.

The system, various components of the system, or processes described herein can be implemented by one or more processors. In some embodiments, the processor may be a processing unit of a computer system. FIG. 20 shows a computer system 2001 that is programmed or otherwise configured to implement the ground mobility analysis and intent prediction system. The computer system 2001 can regulate various aspects of the present disclosure. The computer system 2001 can be an electronic device of a user or a computer system that is remotely located with respect to the electronic device. The electronic device can be a mobile electronic device.

The computer system 2001 includes a central processing unit (CPU, also "processor" and "computer processor" herein) 2005, which can be a single core or multi core processor, or a plurality of processors for parallel processing. The computer system 2001 also includes memory or memory location 2010 (e.g., random-access memory, read-only memory, flash memory), electronic storage unit 2015 (e.g., hard disk), communication interface 2020 (e.g., network adapter) for communicating with one or more other systems, and peripheral devices 2025, such as cache, other memory, data storage and/or electronic display adapters. The memory 2010, storage unit 2015, interface 2020 and peripheral devices 2025 are in communication with the CPU 2005 through a communication bus (solid lines), such as a motherboard. The storage unit 2015 can be a data storage unit (or data repository) for storing data. The computer system 2001 can be operatively coupled to a computer network ("network") 2030 with the aid of the communication interface 2020. The network 2030 can be the Internet, an internet and/or extranet, or an intranet and/or extranet that is in communication with the Internet. The network 2030 in some cases is a telecommunication and/or data network. The network 2030 can include one or more computer servers, which can enable distributed computing, such as cloud computing. The network 2030, in some cases with the aid of the computer system 2001, can implement a peer-to-peer network, which may enable devices coupled to the computer system 2001 to behave as a client or a server.

The CPU 2005 can execute a sequence of machine-readable instructions, which can be embodied in a program or software. The instructions may be stored in a memory location, such as the memory 2010. The instructions can be directed to the CPU 2005, which can subsequently program or otherwise configure the CPU 2005 to implement methods of the present disclosure. Examples of operations performed by the CPU 2005 can include fetch, decode, execute, and writeback.

The CPU 2005 can be part of a circuit, such as an integrated circuit. One or more other components of the system 2001 can be included in the circuit. In some cases, the circuit is an application specific integrated circuit (ASIC).

The storage unit 2015 can store files, such as drivers, libraries and saved programs. The storage unit 2015 can store user data, e.g., user preferences and user programs. The computer system 2001 in some cases can include one or more additional data storage units that are external to the computer system 2001, such as located on a remote server that is in communication with the computer system 2001 through an intranet or the Internet.

The computer system 2001 can communicate with one or more remote computer systems through the network 2030. For instance, the computer system 2001 can communicate with a remote computer system of a user (e.g., a user device). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2001 via the network 2030.

Methods as described herein can be implemented by way of machine (e.g., computer processor) executable code stored on an electronic storage location of the computer system 2001, such as, for example, on the memory 2010 or electronic storage unit 2015. The machine executable or machine readable code can be provided in the form of software. During use, the code can be executed by the processor 2005. In some cases, the code can be retrieved from the storage unit 2015 and stored on the memory 2010 for ready access by the processor 2005. In some situations, the electronic storage unit 2015 can be precluded, and machine-executable instructions are stored on memory 2010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2001 can include or be in communication with an electronic display 2035 that comprises a user interface (UI) 2040 for providing, for example, a graphical user interface as described elsewhere herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2005. The algorithm can, for example, trained models such as transport plan engine.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for predicting a trip intent of a user trip taken by a user to determine information to provide to the user during the user trip, comprising:
   (a) receiving a starting geographic location of a travel route and data about an identity of the user;
   (b) training a trip abstractor by:
      (1) obtaining a training plurality of prior trip records, wherein a prior trip record of the training plurality of prior trip records comprises a trip intent and trip characteristics of a prior trip for which an intent was determined;
      (2) generating a plurality of models, wherein for at least two models of the plurality of models, each of the at least two models has an associated trip intent different from the trip intent associated with the other of the at least two models and each of the at least two models comprises a trip classifier that is trained on a subset of the training plurality of prior trip records that are prior trip records having a trip intent that matches the associated trip intent; and
      (3) storing the plurality of models into a trip classifier database;
   (c) identifying, using a trip identification engine, a trip dataset from location data collected from the user trip, wherein the location data provides geospatial points visited by the user during the user trip, with at least some visited points provided to the trip identification engine in real-time;
   (d) applying the trip dataset and the trip classifier database to an intent predictor, to determine a determined trip intent of the user trip, wherein the intent predictor uses at least the at least two models of the plurality of models for determining the determined trip intent of the user trip; and
   (e) presenting, to the user, on an electronic device, while the user is traveling in a vehicle along at least a portion of the travel route, one or more transactional options identified based, at least in part, on the determined trip intent of the user trip.

2. The method of claim 1, wherein said starting geographic location is received in a form of Global Positioning System (GPS) data.

3. The method of claim 1, wherein said starting geographic location is entered by said user via a graphical user interface (GUI) on said electronic device, or is determined using in part a geographic location of said electronic device, which geographic location is determined by a global position system or signal triangulation.

4. The method of claim 1, wherein the training plurality of prior trip records comprises uncorrelated GPS data.

5. The method of claim 4, wherein the training plurality of prior trip records comprises labeled data obtained using clustering analysis of a plurality of trip data records, wherein the clustering analysis automatically identifies subsets of trips with common characteristics.

6. The method of claim 5, further comprising generating said plurality of trip data records by associating the uncorrelated GPS data with one or more person identities.

7. The method of claim 5, wherein said plurality of trip data records are augmented by a social graph, transportation data, or purchase data of the corresponding person identity.

8. The method of claim 1, wherein training the trip abstractor comprises creating labels for a segment of trip based on one or more labeling rules.

9. The method of claim 1, further comprising predicting a transportation mode for one or more portions of said travel route.

10. The method of claim 9, wherein said transportation mode comprises autonomous vehicle, ride-hailing service, rail transportation, and/or terrestrial mass transit vehicle.

11. The method of claim 1, further comprising updating said trip intent or destination upon receiving new location data during the user trip.

12. A system for predicting a trip intent of a user trip taken by a user to determine information to provide to the user during the user trip, comprising:
- a trip abstractor, trained by (1) obtaining a training plurality of prior trip records, wherein a trip record of the training plurality of prior trip records comprises a trip intent and trip characteristics of a prior trip for which an intent was determined, and (2) generating a plurality of models, wherein for at least two models of the plurality of models, each of the at least two models has an associated trip intent different from the trip intent associated with the other of the at least two models and each of the at least two models comprises a trip classifier that is trained on a subset of the training plurality of prior trip records that are prior trip records having a trip intent that matches the associated trip intent;
- a trip classifier database for storing the plurality of models generated by the trip abstractor;
- a trip identification engine for identifying a trip dataset from location data collected from the user trip, wherein the location data includes a travel route represented by geospatial points visited by the user during the user trip, with at least some visited points provided to the trip identification engine in real-time;
- an intent predictor coupled to the trip identification engine and the trip classifier database, for determining a determined trip intent of the user trip, while the user is traveling in a vehicle along at least a portion of the travel route, based at least on (1) a matching model of the plurality of models that is matching in that it has a trip intent that matches the determined trip intent of the user trip, (2) a starting geographic location of the travel route, and (3) data about an identity of the user; and
- a user interface of an electronic device adapted to present one or more transactional options identified based at least in part on the determined trip intent of the user trip, to be presented while the user is traveling in along the travel route.

13. The system of claim 12, wherein said starting geographic location is received in a form of Global Positioning System (GPS) data.

14. The system of claim 12, wherein said starting geographic location is entered by said user via a graphical user interface (GUI) on said electronic device, or is determined using in part a geographic location of said electronic device, which geographic location is determined by a global position system or signal triangulation.

15. The system of claim 12, wherein the training plurality of prior trip records comprises uncorrelated GPS data.

16. The system of claim 15, wherein the training plurality of prior trip records comprises labeled data obtained using clustering analysis of a plurality of trip data records.

17. The system of claim 16, wherein the plurality of trip data records associate the uncorrelated GPS data with one or more person identities.

18. The system of claim 16, wherein said plurality of trip data records are augmented by a social graph, transportation data, or purchase data of the corresponding person identity.

19. The system of claim 12, wherein the intent predictor is further configured to predict a transportation mode for one or more portions of the travel route.

20. The system of claim 19, wherein said transportation mode comprises autonomous vehicle, ride-hailing service, rail transportation, and/or terrestrial mass transit vehicle.

* * * * *